US006812741B2

(12) United States Patent
Shibata et al.

(10) Patent No.: US 6,812,741 B2
(45) Date of Patent: Nov. 2, 2004

(54) BIDIRECTIONAL SIGNAL TRANSMISSION CIRCUIT AND BUS SYSTEM

(75) Inventors: Osamu Shibata, Moriguchi (JP); Yoshiyuki Saito, Katano (JP); Yukihiro Fukumoto, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/394,677

(22) Filed: Mar. 21, 2003

(65) Prior Publication Data

US 2003/0197528 A1 Oct. 23, 2003

Related U.S. Application Data

(62) Division of application No. 09/535,639, filed on Mar. 24, 2000, now abandoned.

(30) Foreign Application Priority Data

Apr. 22, 1999 (JP) ............................................ 11-114435

(51) Int. Cl.[7] .......................................... H03K 19/0175
(52) U.S. Cl. ............................................ 326/82; 326/62
(58) Field of Search ............................... 326/82, 62, 21; 365/189.02, 189.04, 220

(56) References Cited

U.S. PATENT DOCUMENTS 5,878,051 A  *  3/1999  Sharma et al. .............. 714/724
6,051,989 A      4/2000  Walck
6,356,106 B1    3/2002  Greeff et al.

FOREIGN PATENT DOCUMENTS

JP            10069342         3/1998

* cited by examiner

Primary Examiner—Daniel D. Chang

(57) ABSTRACT

A bidirectional transmission circuit for inputting/outputting a signal from/onto a bidirectional transmission line includes: a transceiver for transmitting/receiving a signal; a first element having an impedance; a second element being a short line; and a switching unit for coupling the transceiver to the bidirectional transmission line via the first element when the transceiver transmits a signal, and coupling the transceiver to the bidirectional transmission line via the second element when the transceiver receives a signal.

15 Claims, 17 Drawing Sheets

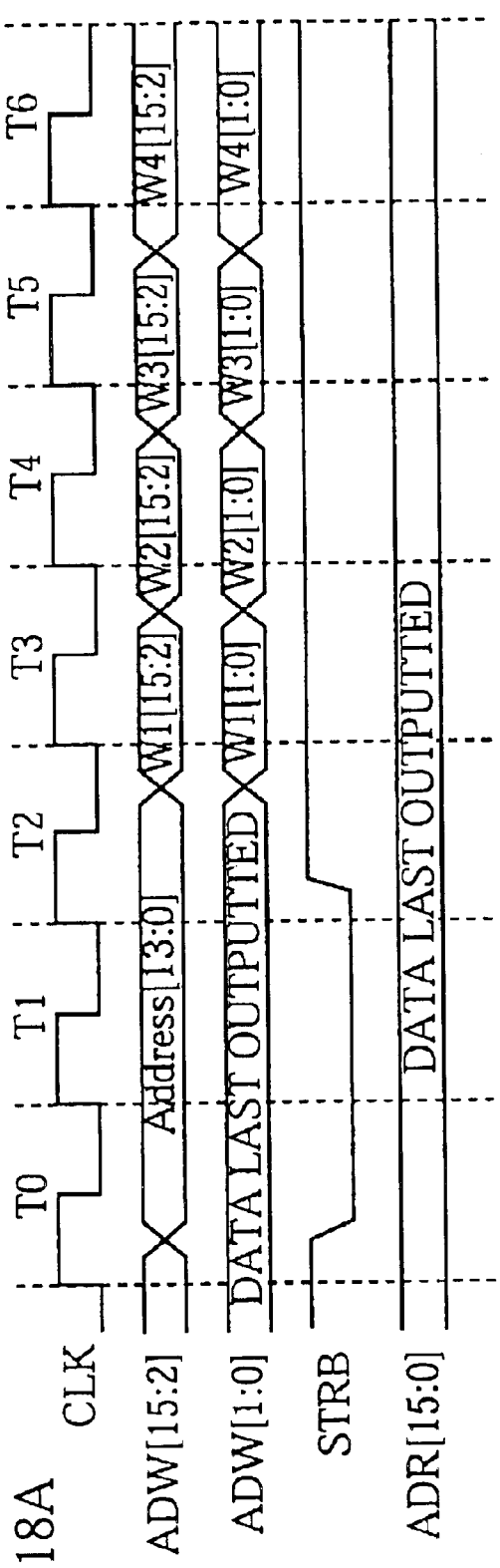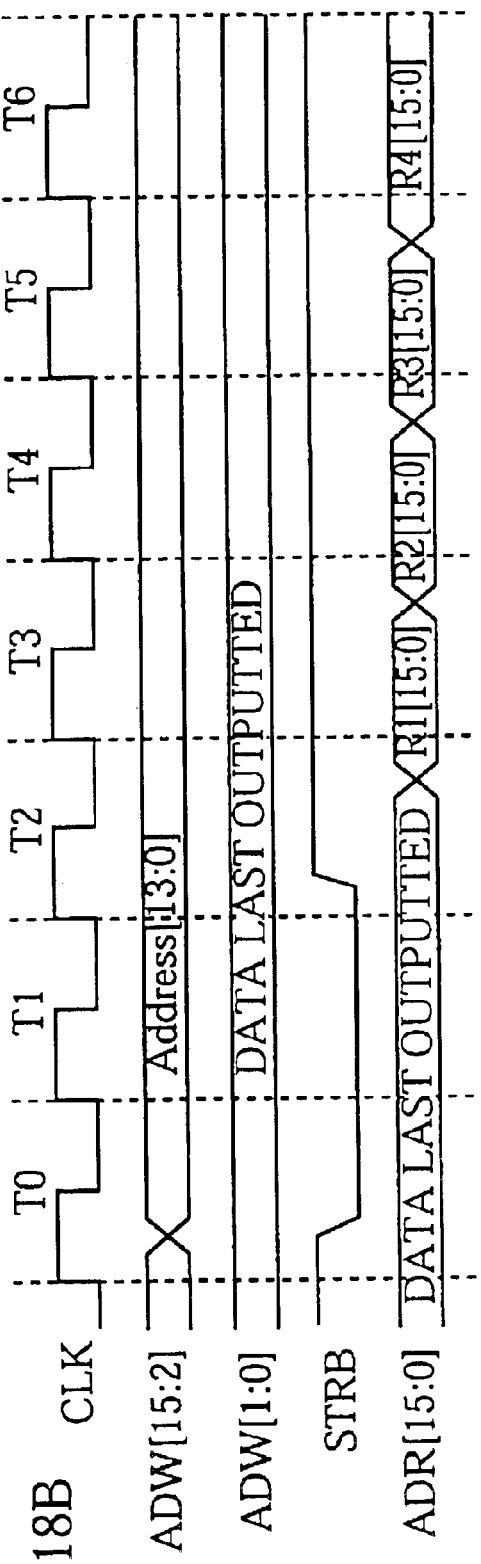

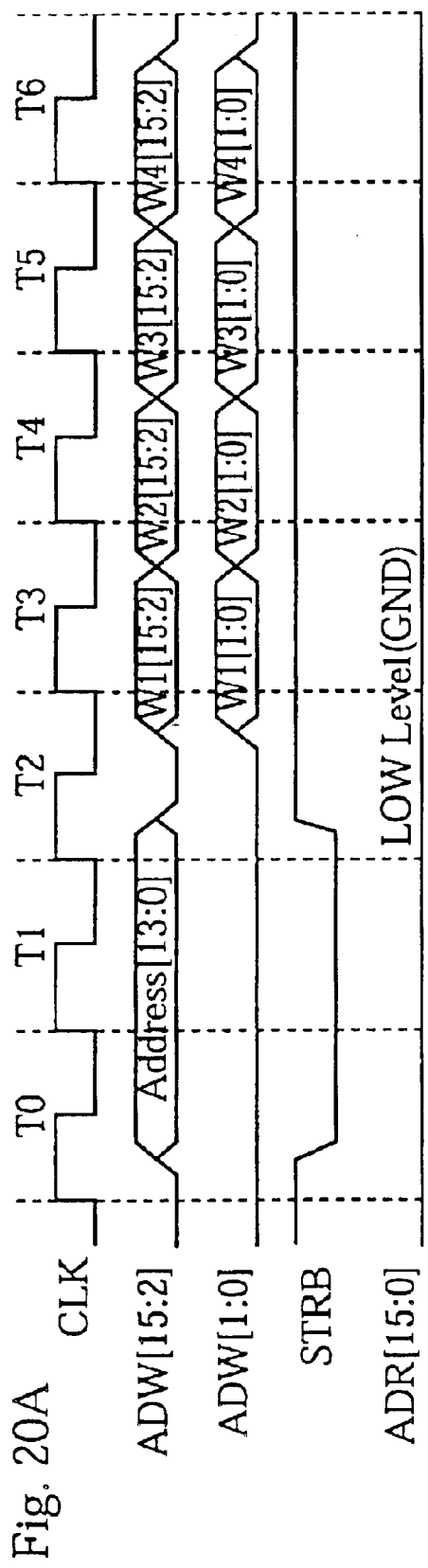
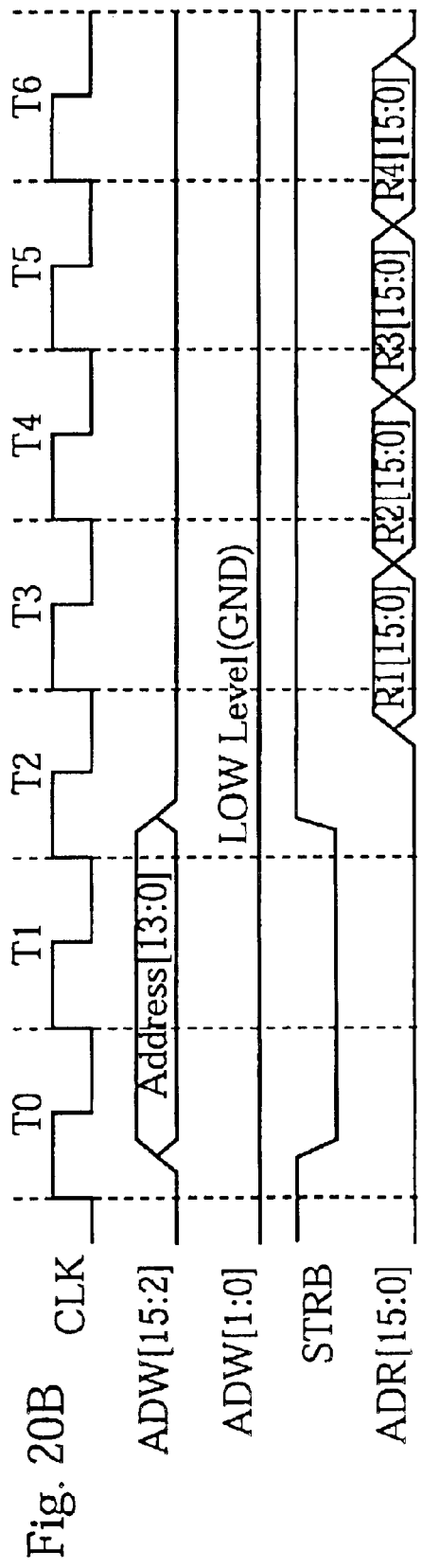

BIDIRECTIONAL SIGNAL TRANSMISSION CIRCUIT AND BUS SYSTEM

This is a divisional application of U.S. Ser. No. 09/535,639 filed on Mar. 24, 2000 is now abandoned.

BACKGROUND OF THE INVENTION

1. Field of the Invention

The present invention relates to a bidirectional signal transmission circuit and a bus system for facilitating impedance matching and fast signal transfer.

2. Description of the Prior Art

As MPUs and memory devices become faster, the demand for speeding up data transfer on buses is growing in recent years. However, such speedups also incur difficulties in the proper transfer of data. This is because disturbances such as reflections of signals due to a mismatch with a characteristic impedance of a transmission line and crosstalk between adjacent lines become more serious with increase in data transfer rate.

To avoid such unwanted signal reflections, impedance matching is commonly performed by means of series termination that inserts a resistor in series with a transmission line or parallel termination that inserts a resistor between a transmission line and a power or ground plane.

The series termination couples a resistor in series between an output buffer (a driver) and a transmission line, to match the output impedance with the transmission line impedance and reduce the output amplitude. When the transmission line is unidirectional, placing the resistor on the output line (i.e. at the output port or terminal) of the output buffer is effective. The unidirectional transmission line referred to here is a transmission line that transmits signals only in one direction.

FIG. 1 shows an example circuit where series termination is applied to an unidirectional transmission line. To eliminate an impedance mismatch between an output buffer 801 and a unidirectional transmission line 803 coupled thereto, a resistor 804 is positioned in series between the output buffer 801 and the unidirectional transmission line 803. Let Ro1 be the output resistance of the output buffer 801, Zo be the characteristic impedance of the unidirectional transmission line 803, and Rs1 be the value of the resistor 804. Then Rs1 is determined by the equation Rs1=Zo−Ro1, to match the output impedance (Rs1+Ro1) with the transmission line impedance (Zo) (i.e. to establish the relation Rs1+Ro1=Zo). Thus, the resistor 804 serves to match the impedance of the output buffer side (output impedance) to that of the unidirectional transmission line side at a junction between the resistor 804 and the transmission line 803.

However, the above series termination is not applicable to a bidirectional transmission line that transmits signals in two directions, because in the case of the bidirectional transmission line its both ends will act as output ends as well as input ends.

FIG. 2 shows an example circuit where a resistor is series-connected to one end of a bidirectional transmission line. Suppose Rs1 of a resistor 906 is determined in the same way as FIG. 1. When transmitting a signal from an output buffer 901, an output impedance and an impedance of a bidirectional transmission line 905 match. However, when transmitting a signal from an output buffer 903, an impedance mismatch occurs due to the absence of a series terminating resistor between the output buffer 903 and the bidirectional transmission line 905, as a result of which signal reflections arise.

Several impedance matching methods for bidirectional transmission lines have been devised in recent years through the use of various bus topologies and termination techniques. Examples of such methods are RSL (Rambus Signaling Logic) proposed by Rambus, Inc. and SSTL (Stub Series Terminated Logic) [EIAJED-5512] standardized by the Electronic Industries Association of Japan. FIGS. 3 and 4 show example circuits that employ RSL and SSTL, respectively. In the figures, a portion enclosed by a dashed line shows a pair of an output buffer (a driver) and an input buffer (a receiver) in greater detail. The output buffer in FIG. 3 is an open drain output, whereas the output buffer in FIG. 4 is a tri-state output.

RSL in FIG. 3 is characterized by a restricted bus topology where single-stroke configuration with no branch lines is adopted to a bus line, in order to ensure impedance matching. In SSTL in FIG. 4, on the other hand, a bus line is parallel terminated and series terminating resistors are arranged at branch points of lines branched from the bus line, to match the branch lines to the bus line. Thus, SSTL enables impedance matching for a bus topology that has branch lines.

However, with conventional bus interfaces, it is becoming increasingly difficult to improve clock frequencies for faster signal transmission and at the same time ensure impedance matching.

In the case of RSL in FIG. 3, when mounting an LSI (Large-Scale Integration) onto a board, leads included in the LSI package will end up being branch lines, so that it is impossible to form a bus line of single-stroke configuration which contains no branch lines. Though such a bus line can operate without problems within a frequency range up to the order of some hundreds of megahertz, at higher frequencies (the order of gigahertz) the bus line inevitably suffers signal reflections because of the presence of several branch lines (leads) which do not match with the bus line.

In the case of SSTL in FIG. 4, the series terminating resistors arranged at the branch points serve to match impedances when signals are transmitted from the branch lines to the bus line (output onto the bus line) but not when signals are transmitted from the bus line to the branch lines (input from the bus line). Therefore, such a bus line also suffers signal reflections at high frequencies (the order of gigahertz).

SUMMARY OF THE INVENTION

The first object of the invention is to provide a bidirectional signal transmission circuit that ensures impedance matching and fast signal transmission without restrictions on bus topology, regardless of in which direction a signal is to be transmitted.

The second object of the invention is to provide a bus system that facilitates impedance matching and fast signal transmission.

The third object of the invention is to provide a bus interface that delivers high noise immunity in addition to the above stated effects.

The first and second objects can be fulfilled by a bidirectional transmission circuit for inputting/outputting a signal from/onto a bidirectional transmission line, including: a transceiver for transmitting/receiving a signal; a first element having an impedance; a second element being a short line; and a switching unit for coupling the transceiver to the bidirectional transmission line via the first element when the transceiver transmits a signal, and coupling the transceiver to the bidirectional transmission line via the second element when the transceiver receives a signal.

With the above construction, the impedance on the side of the transceiver varies from the time of signal transmission by the transceiver to the time of signal reception by the transceiver. Accordingly, the transceiver and the bidirectional transmission line can easily be matched regardless of whether the transceiver transmits or receives a signal, and the signal transfer can be accelerated.

Here, a combined impedance of an output impedance of the transceiver and the impedance of the first element may match a characteristic impedance of the bidirectional transmission line.

Here, the first element may be a resistor.

With the above construction, the first element with the proper impedance can easily be realized by means of a resistor, and the second element can easily be realized by means of a wire or a pattern on a printed board.

Here, the first element may be a driver that amplifies an output current of the transceiver.

With the above construction, the impedance matching is ensured by matching the transceiver to the bidirectional transmission line or by matching the bidirectional transmission line to the transceiver. Further, even when the current drive ability of the transceiver is low, such a drive ability is appropriately adjusted by equipping with a driver that has a drive ability responsive to the load on the bidirectional transmission line.

Here, the first element may be a combination of a resistor and a driver that amplifies an output current of the transceiver.

With the above construction, not only the stated effect due to the driver can be achieved but also the proper impedance of the first element can be attained by the resistor.

Here, the switching unit may have a first switching element and a second switching element which inversely toggle between an on state and an off state, wherein the first switching element and the first element are connected in series to form a first series circuit, the second switching element and the second element are connected in series to form a second series circuit, and the first series circuit and the second series circuit are connected in parallel between the transceiver and the bidirectional transmission line.

With the above construction, the first or second element is coupled to either the transceiver or the bidirectional transmission line via the first or second switching element. The first and second switching elements can be implemented at low cost by, for instance, FET switches.

Here, the switching unit may have a first switching element and a second switching element which inversely toggle between an on state and an off state and a third switching element and a fourth switching element which inversely toggle between the on state and the off state, wherein the first switching element and the third switching element simultaneously toggle into a same state, the first switching element, the first element, and the third switching element are connected in series in the stated order, to form a first series circuit, the second switching element, the second element, and the fourth switching element are connected in series in the stated order, to form a second series circuit, and the first series circuit and the second series circuit are connected in parallel between the transceiver and the bidirectional transmission line.

With the above construction, the first or second element is coupled between the transceiver and the bidirectional transmission line through switching elements connected to both sides of the first or second element. Accordingly, when no connection is required, the first and second elements are completely discoupled from the transceiver and the bidirectional transmission line, with it being possible to eliminate any isolated line portions which are not electrically terminated.

Here, the first switching element and the second switching element may inversely toggle in response to one of a write signal and an output enable signal given to the transceiver.

With the above construction, the first and second switching elements inversely toggle in response to a write signal or an output enable signal, so that the connection state can be switched between the first element and the second element with the input/output timing of the transceiver.

The second object can also be fulfilled by a bus system for transmitting an address and data between a first LSI (Large Scale Integrated Circuit) that performs an access and a second LSI that is to be accessed, including: a first unidirectional bus for transmitting an address and data outputted from the first LSI, to the second LSI; and a second unidirectional bus for transmitting data outputted from the second LSI, to the first LSI, wherein when the first LSI performs a write access, a write address and write data are transmitted through the first unidirectional bus, and when the first LSI performs a read access, a read address is transmitted through the first unidirectional bus and read data is transmitted through the second unidirectional bus.

With the above construction, the write access and the read access from the first LSI to the second LSI are carried out using only unidirectional buses, so that impedance matches are easily attained.

Here, signal lines included in the first unidirectional bus and signal lines included in the second unidirectional bus may be alternately routed.

The third object can be fulfilled with this construction. That is to say, by alternately routing the signal lines included in the first unidirectional bus with the signal lines included in the second unidirectional bus, interference such as crosstalk is suppressed and noise immunity is improved.

Here, in at least one of the first LSI and the second LSI, input and output terminals that correspond to the alternately routed signal lines may be alternately placed.

With the above construction, the input terminals and the output terminals are alternately arranged in the LSI, which further benefits the noise immunity.

Here, in the write access the write data may be transmitted through the first unidirectional bus after the write address.

With the above construction, the write address and the write data are time division multiplexed on the first unidirectional bus, so that the number of terminals to be mounted in the first and second LSIs can be minimized.

Here, the bus system may further include a maintaining unit for maintaining, while at least one of the first unidirectional bus and the second unidirectional bus is idle, a potential of the idle bus at a fixed level which is one of a low level and a high level.

With the above construction, the potential of the bus that is being idle is held at the fixed level, which further benefits the noise immunity.

Here, the maintaining unit may maintain the potential of the idle bus at the fixed level at both ends of the idle bus.

With the above construction, the potential of the bus that is being idle is held at the fixed level at both ends of the bus, so that the time taken for attaining the fixed potential across the bus is shortened and the transmission speed is increased.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 18A is a write timing diagram for the bus system shown in FIG. 17;

FIG. 18B is a read timing diagram for the bus system shown in FIG. 17;

FIG. 20A is a write timing diagram for the bus system shown in FIG. 19;

FIG. 20B is a read timing diagram for the bus system shown in FIG. 19;

DESCRIPTION OF THE PREFERRED EMBODIMENT(S)

The following is a description of embodiments of the present invention with reference to the figures.

First Embodiment

Figure 7:
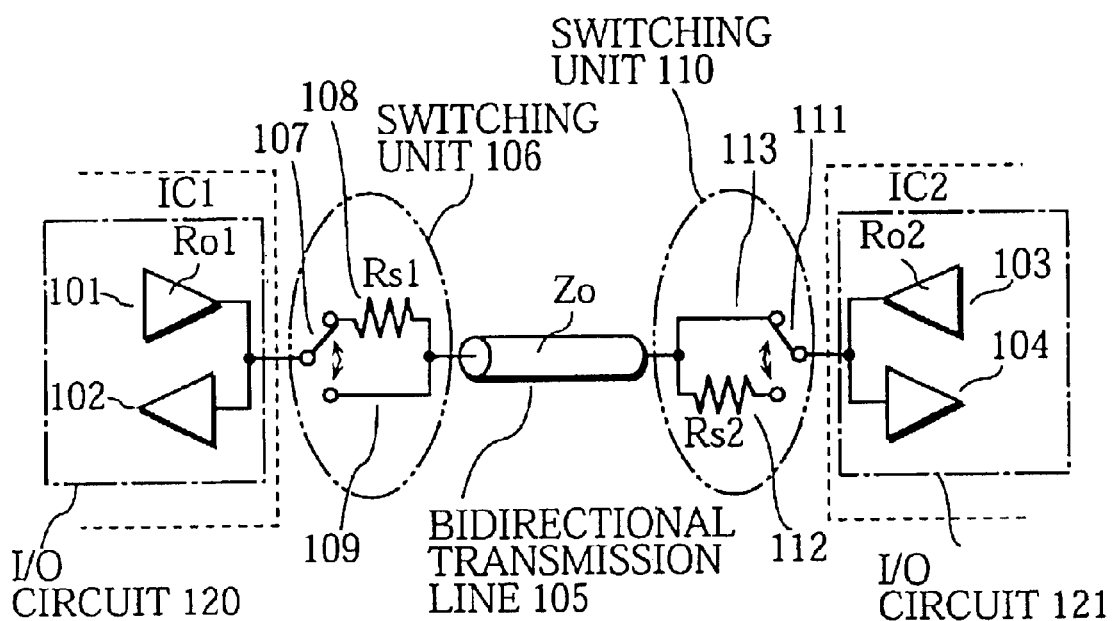
FIG. 7 shows the construction of a bidirectional signal transmission circuit according to the first embodiment of the invention.

FIG. 7 shows the construction of a bidirectional signal transmission circuit according to the first embodiment of the invention. In the figure, a bidirectional transmission line 105 is a transmission line (whose characteristic impedance is Zo) for transmitting signals in two directions. This bidirectional transmission line 105 is one of bus lines constituting a bidirectional bus, such as a data bus, which connects semiconductor devices IC1 and IC2.

An I/O (Input/Output) circuit 120 is equipped within semiconductor device IC1 for inputting/outputting signals, and is mainly made up of an output buffer 101 (whose output resistance is Ro1) and an input buffer 102.

An I/O circuit 121 is equipped within semiconductor device IC2 for inputting/outputting signals, and is mainly made up of an output buffer 103 (whose output resistance is Ro2) and an input buffer 104.

A switching unit 106 assumes either of two states, namely series termination and short, between the bidirectional transmission line 105 and the I/O circuit 120. The switching unit 106 includes a series terminating resistor 108 (whose resistance is Rs1), a wire 109 for causing a short, and a switch 107. The switch 107 changes its connection to the resistor 108 when the I/O circuit 120 outputs a signal, and to the wire 109 when the I/O circuit 120 inputs a signal (or except when the I/O circuit 120 outputs a signal).

A switching unit 110 assumes either of two states, series termination and short, between the bidirectional transmission line 105 and the I/O circuit 121. The switching unit 110 includes a series terminating resistor 112 (whose resistance is Rs2), a wire 113 for causing a short, and a switch 111. The switch 111 changes its connection to the resistor 112 when the I/O circuit 121 outputs a signal, and to the wire 113 when the I/O circuit 121 inputs a signal (or except when the I/O circuit 121 outputs a signal).

Here, the resistance Rs1 of the resistor 108 is such that Rs1=Zo−Ro1. As a result, when the I/O circuit 120 outputs a signal (i.e. when the I/O circuit 121 inputs a signal) impedance matching is established at the left end of the bidirectional transmission line 105. In a like manner, the resistance Rs2 of the resistor 112 is such that Rs2=Zo−Ro2. The wires 109 and 113 may be implemented by patterns on a printed board or resistors of 0 Ω.

Figure 8:
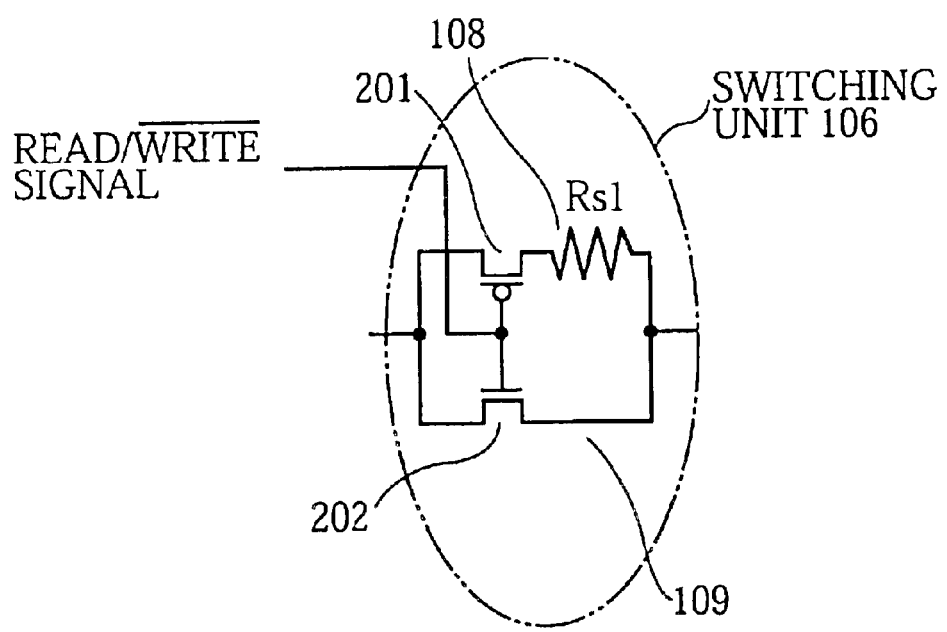
FIG. 8 shows an example circuit of a switching unit in FIG. 7.

FIG. 8 shows an example circuit of the switching unit 106 shown in FIG. 7. In the figure, the switch 107 is made up of FET (Field-Effect Transistor) switches 201 and 202, and a read/write signal is applied to the gates of the FET switches 201 and 202. This read/write signal is outputted by IC1 acting as a bus master. When the read/write signal is low, a write is indicated, whereas when the read/write signal is high, a read (or anything other than a write) is indicated.

In the output of the I/O circuit 120 (i.e. when a write is indicated), the FET switch 201 is on, so that the I/O circuit 120 is coupled to the resistor 108. Meanwhile, in the input of the I/O circuit 120 (when a read is indicated), the FET switch 202 is on, so that the I/O circuit 120 is coupled to the wire 109. The switching unit 110 is constructed in the same way as shown in FIG. 8.

Though the FET switches 201 and 202 are used in FIG. 8, other types of switches such as TTL (Transistor-Transistor Logic) switches and optical switches may be used for switching the connection between the I/O circuit 120 and the bidirectional transmission line 105.

Also, though the switches 107 and 111 are positioned respectively on the sides of the I/O circuits 120 and 121 in FIG. 7, they may instead be positioned on the sides of the bidirectional transmission line 105. Further, though the series terminating resistors 108 and 112 are used in FIG. 7, other impedance components such as inductors or capacitors may instead be used for series termination.

The above constructed bidirectional signal transmission circuit operates in the following manner.

To transmit a signal from the output buffer 101, the switch 107 in the switching unit 106 is connected to the resistor 108, and the switch 111 in the switching unit 110 is connected to the wire 113. Since such a read/write signal as shown in FIG. 8 causes these connections, output data has been guaranteed as valid by this time. This being so, the impedances between the output buffer 101 and the bidirectional transmission line 105 match due to the resistor 108. The signal outputted from the output buffer 101 travels to the input buffer 104 through the resistor 108, the bidirectional transmission line 105, and the wire 113.

On the other hand, to transmit a signal from the output buffer 103, the switch 111 in the switching unit 110 is connected to the resistor 112 and the switch 107 in the switching unit 106 is connected to the wire 109. In this state, the impedances between the output buffer 103 and the bidirectional transmission line 105 match due to the resistor 112. The signal outputted from the output buffer 103 travels to the input buffer 102 through the resistor 112, the bidirectional transmission line 105, and the wire 109.

Thus, the bidirectional signal transmission circuit of the first embodiment switches between the series termination state and the short state at each end of the bidirectional transmission line, in accordance with the signal transmission direction. As a result, impedance matching is ensured at both ends of the bidirectional transmission line, regardless of in which direction the signal is transmitted.

Here, EMI (ElectroMagnetic Interference) reduction components such as EMI filters may be substituted for the series terminating resistors, with it being possible to deliver not only impedance matching but also EMI reduction.

Second Embodiment

Figure 9:
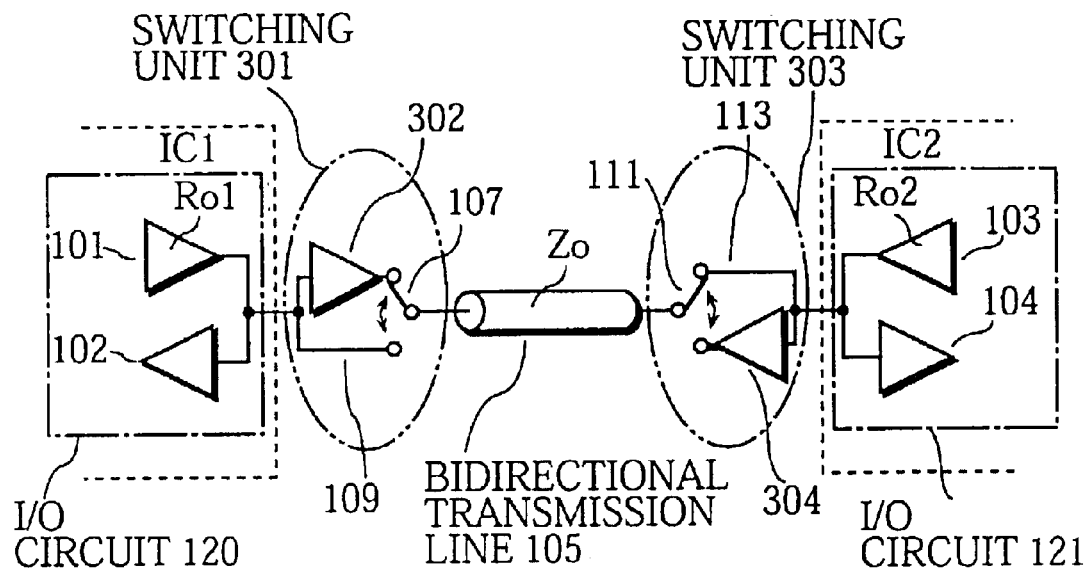
FIG. 9 shows the construction of a bidirectional signal transmission circuit according to the second embodiment of the invention.

FIG. 9 shows the construction of a bidirectional signal transmission circuit according to the second embodiment of the invention. This bidirectional signal transmission circuit differs with that shown in FIG. 7 in that switching units 301 and 303 have replaced the switching units 106 and 110. Construction elements which are the same as those in FIG. 7 have been given the same reference numerals and their explanation has been omitted, so that the following explanation will focus on the differences with the first embodiment.

The switching units 301 and 303 are different with the switching units 106 and 110 in that they are equipped respectively with buffer amplifiers 302 and 304 for amplifying signals instead of the resistors 108 and 112.

The buffer amplifier 302 is a buffer amplifier whose output resistance is approximately equal to the impedance Zo of the bidirectional transmission line 105. Accordingly, in the output of the I/O circuit 120 impedances are matched between the buffer amplifier 302 and the bidirectional transmission line 105. Here, the gain (drive ability) of the buffer amplifier 302 is preferably determined depending on the load on the bidirectional transmission line 105, that is, the number of circuits coupled to the bidirectional transmission line 105.

The same holds true for the buffer amplifier 304.

Thus, the bidirectional signal transmission circuit of the second embodiment not only ensures impedance matching but also varies the signal drive ability by changing the type of the buffer amplifiers 302 and 304 in accordance with the signal transmission direction and the transmission line load.

Also, by including the buffer amplifiers 302 and 304, the bidirectional signal transmission circuit of the second embodiment lends itself for use even when the output buffers 101 and 103 in IC1 and IC2 have low drive abilities.

Third Embodiment

Figure 10:
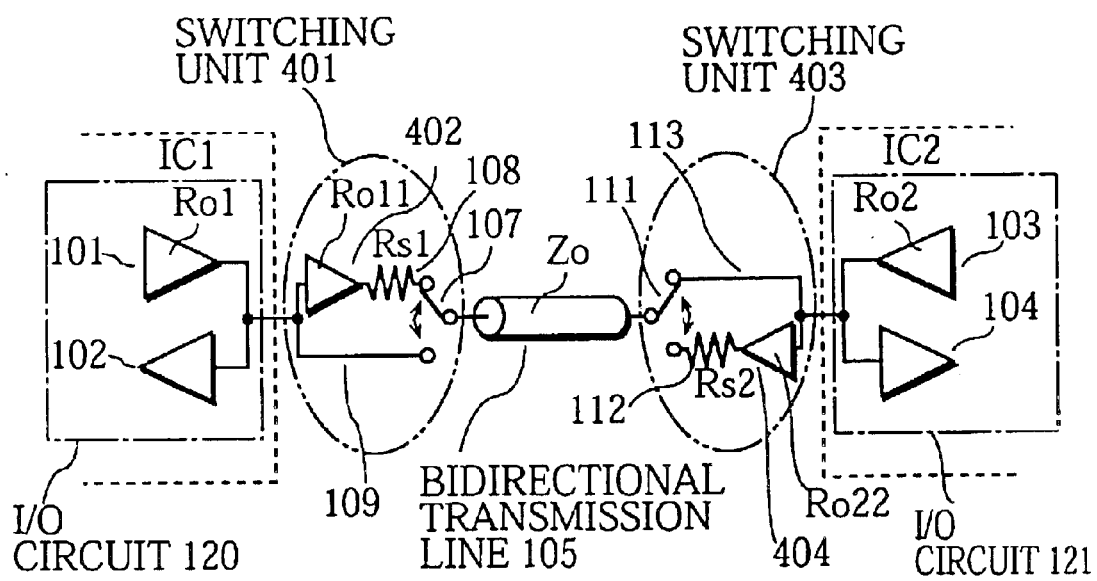
FIG. 10 shows the construction of a bidirectional signal transmission circuit according to the third embodiment of the invention.

FIG. 10 shows the construction of a bidirectional signal transmission circuit according to the third embodiment of the invention. This bidirectional signal transmission circuit differs with that shown in FIG. 7 in that switching units 401 and 403 have replaced the switching units 106 and 110. Construction elements which are the same as those in FIG. 7 have been given the same reference numerals and their explanation has been omitted, so that the following explanation will focus on the differences with the first embodiment.

In the switching units 401 and 403, series terminating resistors 108 and 112 have different resistances from those in the switching units, 106 and 110, and buffer amplifiers 402 and 404 for amplifying signals are newly equipped.

The buffer amplifiers 402 and 404 are arranged at stages immediately preceding the respective series terminating resistors 108 and 112 (i.e. on the sides of IC1 and IC2 with respect to the resistors 108 and 112).

Let Ro11 and Ro22 be output resistances of the respective buffer amplifiers 402 and 404. Then the resistances Rs1 and Rs2 of the respective resistors 108 and 112 are such that Rs1=Zo−Ro11 and Rs2=Zo−Ro22.

When compared with FIG. 9, the resistors 108 and 112 have been added in FIG. 10. These resistors 108 and 112 are used as regulators for matching the buffer amplifiers 402 and 404 to the bidirectional transmission line 105. Since the resistors 108 and 112 are only required to have the resistances Rs1 and Rs2 which satisfy the above equations, they may be implemented not by physical resistors but by patterns on a printed board. In such a case, the proper resistances Rs1 and Rs2 are attained through appropriate adjustment of those patterns in width and length.

Thus, by including the buffer amplifiers 402 and 404 between the output buffers 101 and 103 in IC1 and IC2 and the bidirectional transmission line 105, the bidirectional signal transmission circuit of the third embodiment renders itself suitable even when the output buffers 101 and 103 have low drive abilities.

Also, by including the series terminating resistors 108 and 112 to attain impedance matches between the buffer amplifier 402 and the bidirectional transmission line 105 and between the buffer amplifier 404 and the bidirectional transmission line 105, the bidirectional signal transmission circuit of the third embodiment allows the range of types of component that can be chosen as the buffer amplifiers 402 and 404 to be extended (the only constraint for the buffer amplifiers 402 and 404 being to satisfy Ro11<Zo and Ro22<Zo).

Fourth Embodiment

Figure 11:
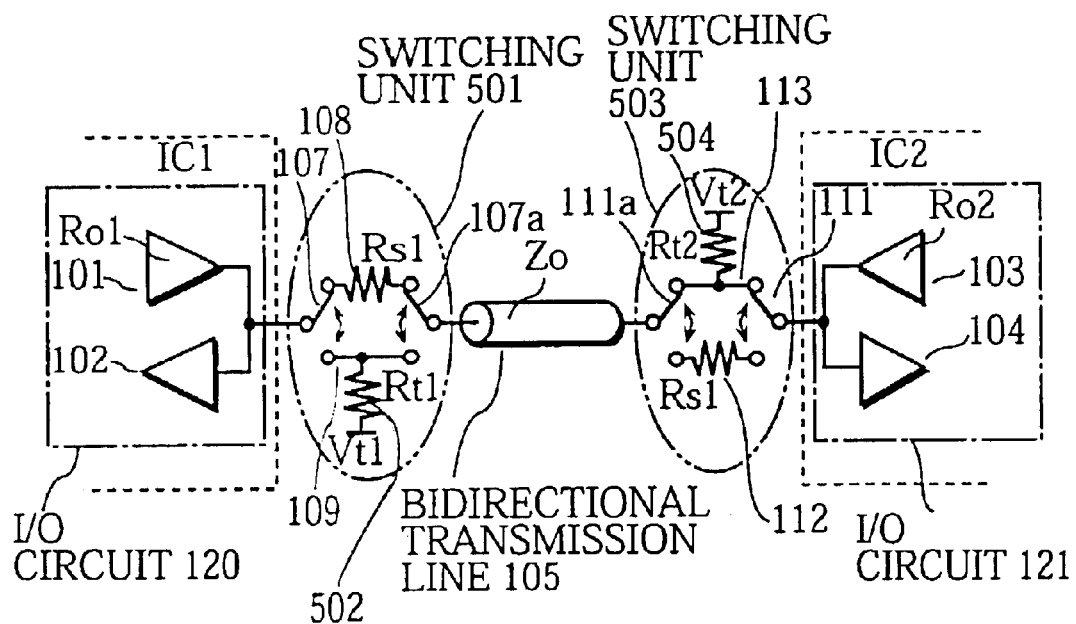
FIG. 11 shows the construction of a bidirectional signal transmission circuit according to the fourth embodiment of the invention.

FIG. 11 shows the construction of a bidirectional signal transmission circuit according to the fourth embodiment of the invention. This bidirectional signal transmission circuit differs with that shown in FIG. 7 in that switching units 501 and 503 have replaced the switching units 106 and 110. Construction elements which are the same as those in FIG. 7 have been given the same reference numerals and their explanation has been omitted, so that the following explanation will focus on the differences with the first embodiment.

When compared with the switching units 106 and 110, the switching units 501 and 503 further include switches 107a and 111a and parallel terminating resistors 502 and 504, respectively.

The switch 107a changes its connection in sync with the switch 107, whereas the switch 111a changes its connection in sync with the switch 111. The switches 107a and 111a may be constructed as shown in FIG. 8.

The parallel terminating resistor 502 is coupled to the wire 109 and has a resistance of Rt1 and a termination potential of Vt1. The resistance Rt1 is such that Rt1=Zo, to ensure impedance matching between the wire 109 and the bidirectional transmission line 105.

The parallel terminating resistor 504 is coupled to the wire 113 and has a resistance of Rt2 and a termination potential of Vt2. The resistance Rt2 is such that Rt2=Zo, to ensure impedance matching between the wire 113 and the bidirectional transmission line 105.

Since the parallel terminating resistors 502 and 504 are equipped in this embodiment, the series terminating resistors 108 and 112 may be replaced by short circuits.

Figure 5:
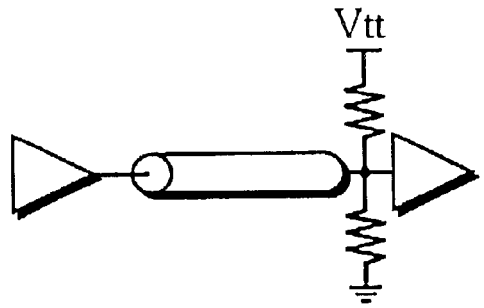
FIG. 5 shows an example circuit that uses Thévenin's termination.
Figure 6:
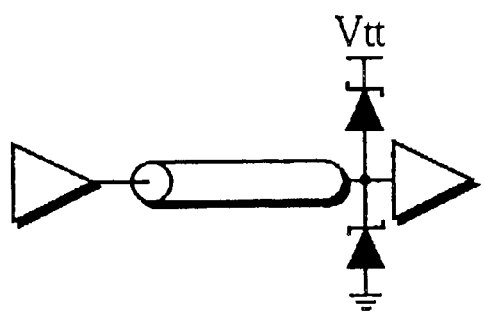
FIG. 6 shows an example circuit that uses diode termination.

Also, though the resistor termination technique is employed for parallel termination in this embodiment, other parallel termination techniques such as Thévenin's termination shown in FIG. 5 or diode termination shown in FIG. 6 are also applicable.

Thus, the bidirectional signal transmission circuit of the fourth embodiment performs parallel termination at one end of the bidirectional transmission line 105 depending on in which direction a signal is transmitted. Accordingly, impedance matches are attained at both ends of the bidirectional transmission line 105, regardless of the signal transmission direction.

Fifth Embodiment

Figure 12:
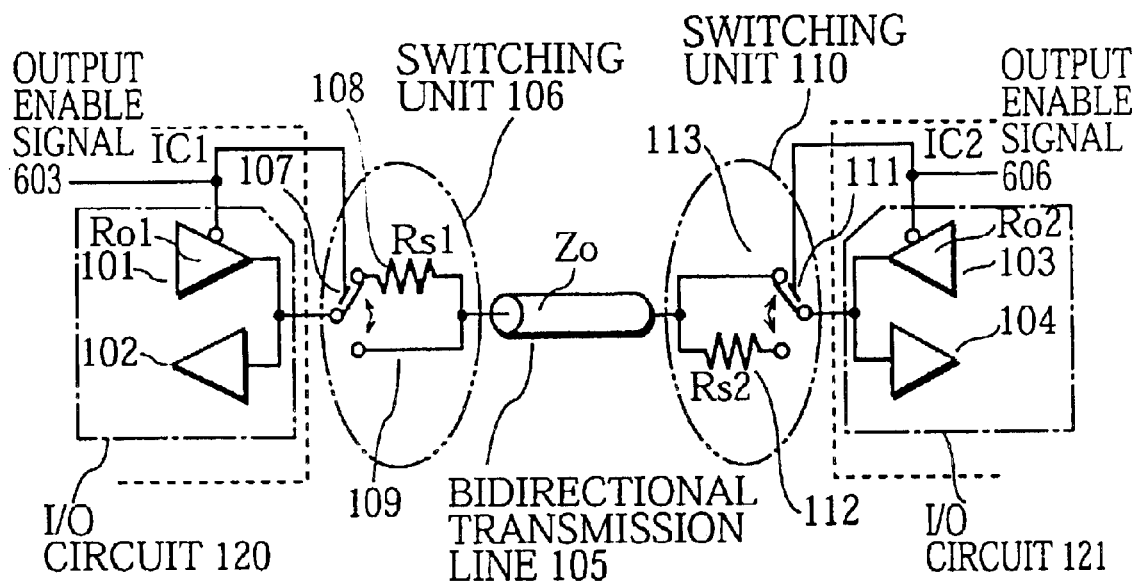
FIG. 12 shows the construction of a bidirectional signal transmission circuit according to the fifth embodiment of the invention.

FIG. 12 shows the construction of a bidirectional signal transmission circuit according to the fifth embodiment of the invention. This bidirectional signal transmission circuit differs with that shown in FIG. 7 in that output enable signals 603 and 606 are respectively inputted in the output buffers 101 and 103 in IC1 and IC2 and then fed to the switches 107 and 111. When compared to FIG. 8, not the read/write signals but the output enable signals 603 and 606 are applied respectively to the gates of the switches 107 and 111.

With this construction, the switching units 106 and 110 operate in sync with the output enable signals 603 and 606 given from the output buffers 101 and 103 in IC1 and IC2. Accordingly, when an output buffer of IC1 or IC2 outputs a signal to an input buffer at the other end, valid data can be transferred with greater reliability at higher speed.

Note here that, though the output enable signals 603 and 606 are active low in this embodiment, they can be made active high by replacing the FET switches 201 and 202 in FIG. 8 with each other.

Also, the construction of the fifth embodiment may apply to not only the first embodiment but also any of the second to fourth embodiments.

Further, though switching units of the same type are placed at both ends of the bidirectional transmission line 105 in each of the above embodiments, switching units of different types, e.g. the switching unit 106 in the first embodiment and the switching unit 503 in the fourth embodiment, may be placed at both ends of the bidirectional transmission line 105.

Sixth Embodiment

Figure 13:
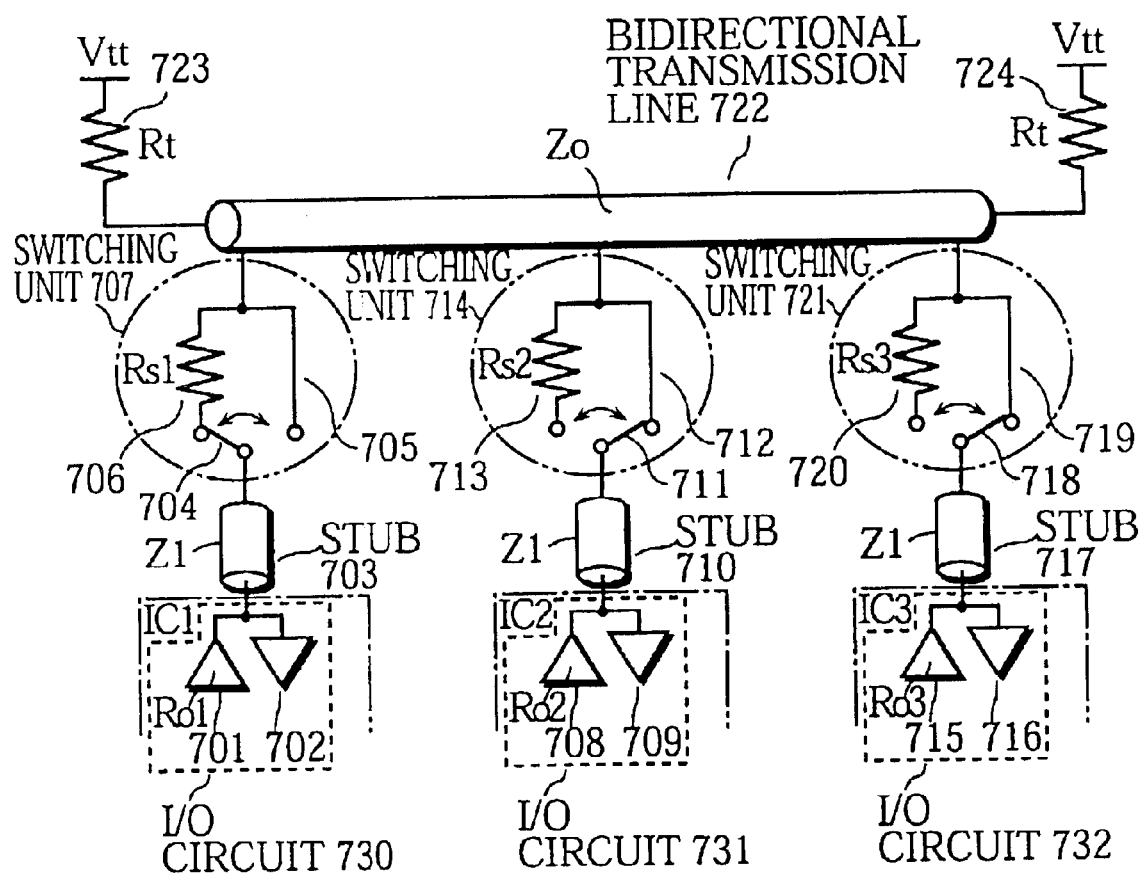
FIG. 13 shows the construction of a bidirectional signal transmission circuit according to the sixth embodiment of the invention.

The sixth embodiment deals with a bidirectional transmission line with branch lines. FIG. 13 shows the construction of a bidirectional signal transmission circuit according to the sixth embodiment of the invention. Here, one of bus lines that constitute a bus is illustrated.

In the figure, parallel terminating resistors 723 and 724 are arranged at both ends of a bidirectional transmission line (bus line) 722, and I/O circuits 730, 731, and 732 are branched from the bidirectional transmission line 722 via switching units 707, 714, and 721 and stubs 703, 710, and 717, respectively. The I/O circuits 730, 731, and 732 are equipped within respective semiconductor devices IC1, IC2, and IC3.

The I/O circuit 730 includes an output buffer 701 (whose output resistance is Ro1) and an input buffer 702. Likewise, the I/O circuit 731 includes an output buffer 708 (whose output resistance is Ro2) and an input buffer 709, and the I/O circuit 732 includes an output buffer 715 (whose output resistance is Ro3) and an input buffer 716.

Let Z1 be the characteristic impedance of each of the stubs 703, 710, and 717, Zo be the characteristic impedance of the bidirectional transmission line 722, and Rt be the resistance of each of the parallel terminating resistors 723 and 724. Then Z1 and Rt are determined by the equations Zo=2×Z1 and Rt=Zo.

The switching units 707, 714, and 721 are constructed similar to the switching unit 106 shown in FIG. 7. In this embodiment, however, resistances Rs1, Rs2, and Rs3 of resistors 706, 713, and 720 in the respective switching units 707, 714, and 721 are determined such that Rs1=Z1−Ro1, Rs2=Z1−Ro2, and Rs3=Z1−Ro3.

The above constructed bidirectional signal transmission circuit operates in the following fashion.

When the output buffer 701 outputs a signal, a switch 704 in the switching unit 707 is connected to the resistor 706, so that the signal flows through the resistor 706 onto the bidirectional transmission line 722. Since Zo=2×Z1, impedances are matched at the T branch point between the stub 703 and the bidirectional transmission line 722. The signal flowing onto the bidirectional transmission line 722 travels in two directions toward both ends of the bidirectional transmission line 722 where impedance matches are attained by the parallel terminating resistors 723 and 724.

Meanwhile, part of the signal on the bidirectional transmission line 722 flows through the switching units 714 and 721 to the stubs 710 and 717, respectively. Here, switches 711 and 718 in the respective switching units 714 and 721 are connected to wires 712 and 719 for causing shorts, so that the part of the signal is guided through the wires 712 and 719 toward the input buffers 709 and 716.

As described above, in the bidirectional signal transmission circuit of the sixth embodiment, at least one parallel terminator is arranged on the bidirectional transmission line, so that impedance matches are attained at both ends of the transmission line. Also, the I/O circuits are coupled to the bidirectional transmission line via the switching units and the stubs, so that impedance matches are attained at branch points between the transmission line and the I/O circuits.

Figure 14:
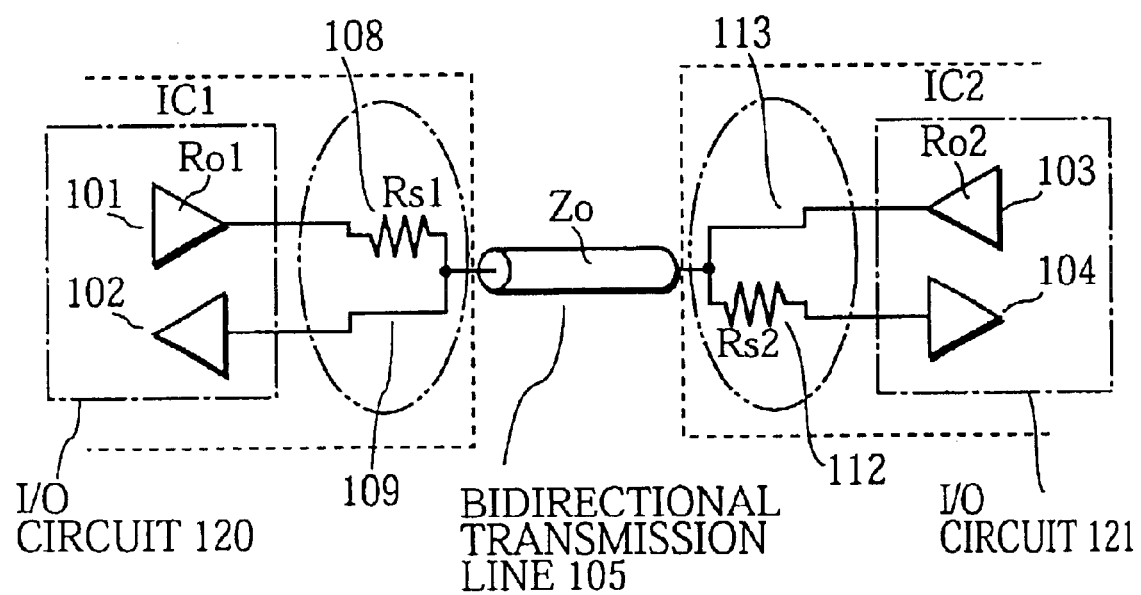
FIG. 14 shows a variant of the above bidirectional signal transmission circuits.

While each of the switching units is equipped outside IC1 and IC2 in the first to sixth embodiments, the switching unit may be built within IC1 or IC2. In such a case, an output line of an output buffer and an input line of an input buffer in an I/O circuit may be separated so as to remove an internal switch from the switching unit. In FIG. 14, for example, the switches 107 and 111 present in the respective switching units 106 and 110 in FIG. 7 have been removed.

Seventh Embodiment

Figure 15:
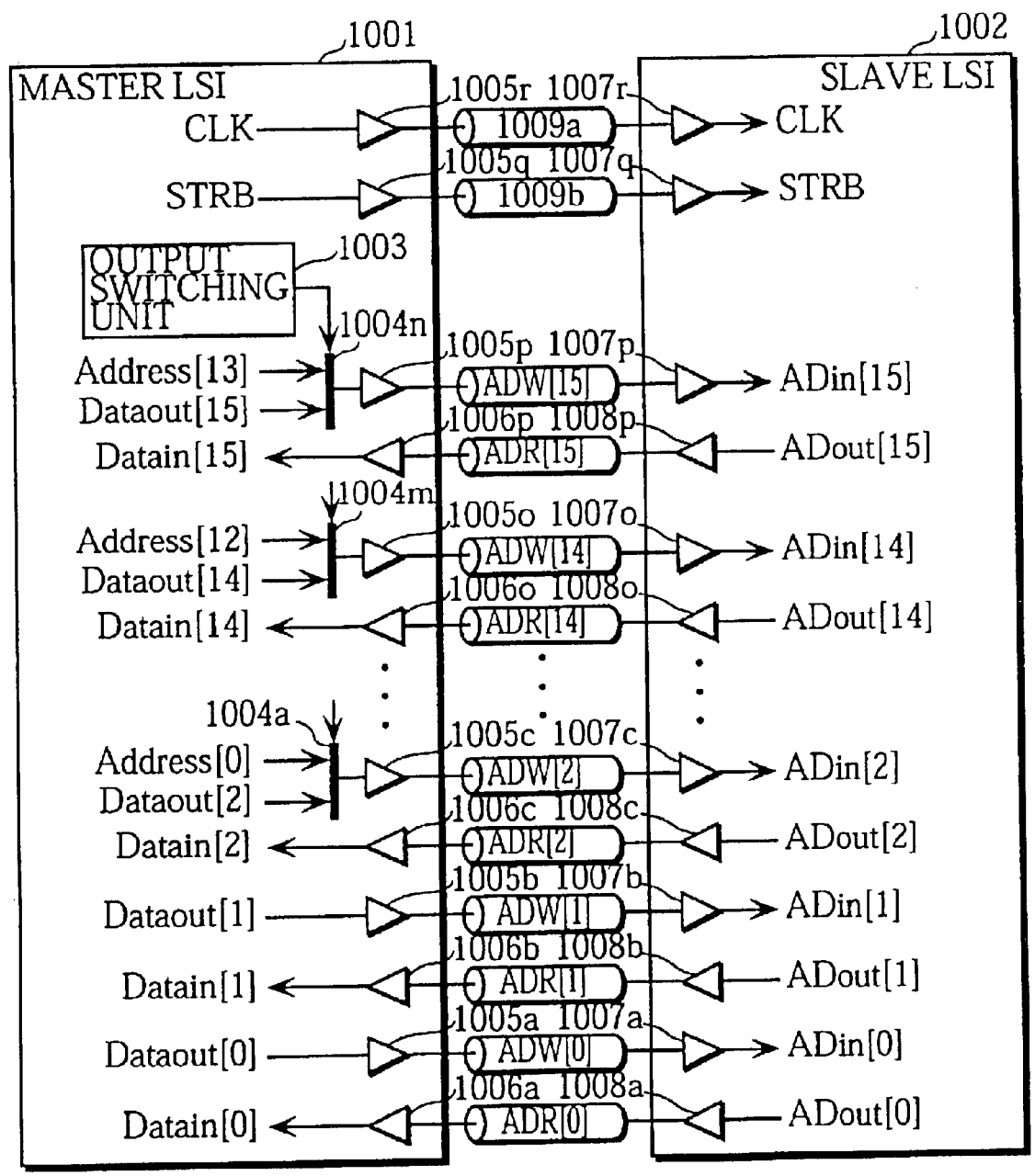
FIG. 15 shows the construction of a bus system according to the seventh embodiment of the invention.

FIG. 15 shows the construction of a bus system according to the seventh embodiment of the invention.

Figure 1:
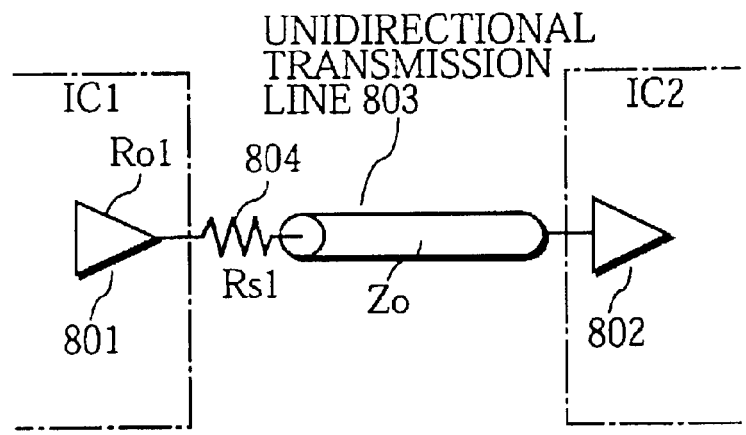
FIG. 1 shows an example circuit where a terminating resistor is coupled in series to a unidirectional transmission line.
Figure 2:
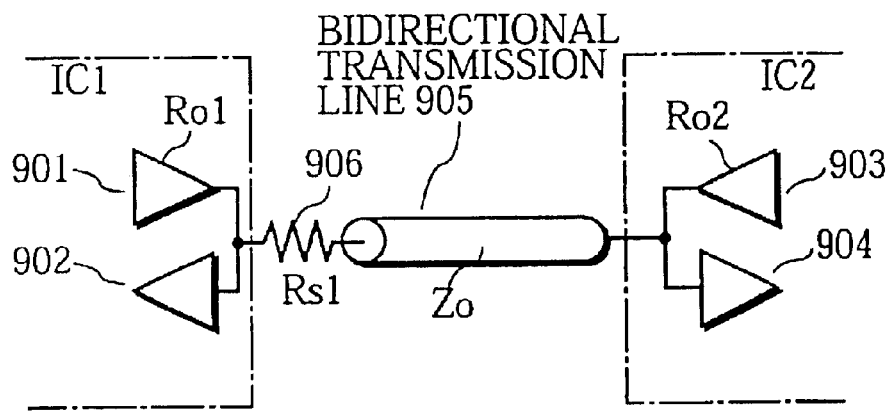
FIG. 2 shows an example circuit where a terminating resistor is coupled in series to one end of a bidirectional transmission line.
Figure 3:
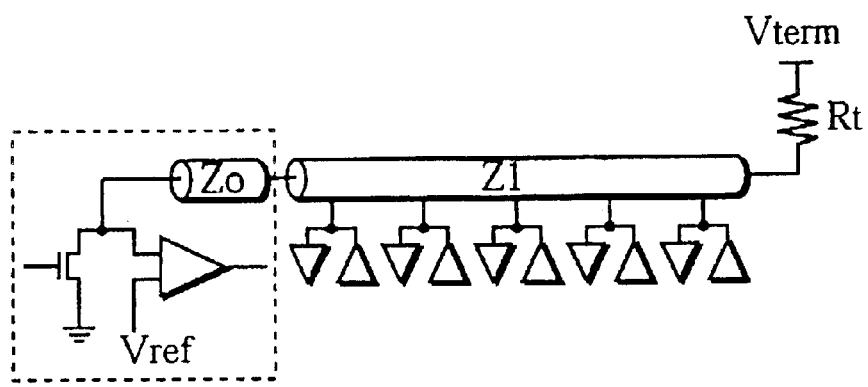
FIG. 3 shows an example circuit that employs RSL.
Figure 4:
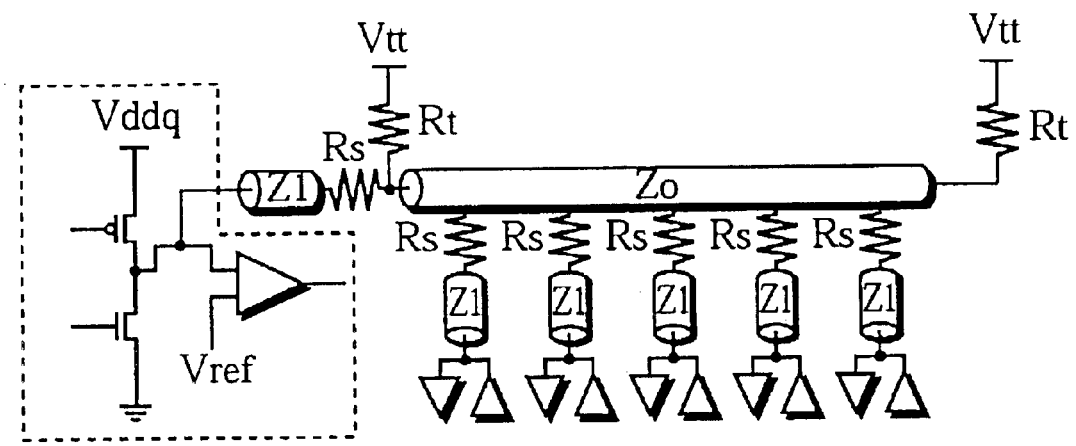
FIG. 4 shows an example circuit that employs SSTL.

In the figure, reference numeral 1001 denotes a master LSI such as a CPU or a memory controller that performs accesses, whereas reference numeral 1002 denotes a slave LSI such as a memory that is to be accessed via buses. The master LSI 1001 and the slave LSI 1002 are coupled by a unidirectional bus ADW[15:0] made up of bus lines ADW[15] to ADW[0] and a unidirectional bus ADR[15:0] made up of bus lines ADR[15] to ADR[0]. Here, numbers written in the brackets [ ] represent bit weights on one or more bus lines. As examples, [15:0] denotes bit weights from the 15th power of 2 to the 0th power of 2, and [15] denotes a bit weight of the 15th power of 2. Though not illustrated, bus ADW[15:0] is equipped with such series terminating resistors as shown in FIG. 1 on the side of the master LSI 1001 and such parallel terminating resistors as shown in FIG. 5 or FIG. 6 on the side of the slave LSI 1002. Also, though not illustrated, bus ADR[15:0] is equipped with such series terminating resistors as shown in FIG. 1 on the side of the slave LSI 1002 and such parallel terminating resistors as shown in FIG. 5 or FIG. 6 on the side of the master LSI 1001. It is desirable to place these series terminating resistors as close to output buffers as possible and the parallel terminating resistors as close to input buffers as possible. By doing so, impedances are easily matched, since the master LSI 1001 and the slave LSI 1002 are coupled by the unidirectional buses instead of a bidirectional bus. It is to be noted that these terminating resistors are not needed if the output resistance of each output buffer is approximately equal to the impedance of a bus line corresponding to the output buffer.

Reference numeral 1009*a* denotes a unidirectional transmission line that carries a clock signal from the master LSI 1001 to the slave LSI 1002.

Reference numeral 1009*b* denotes a unidirectional transmission line that carries a strobe signal from the master LSI 1001 to the slave LSI 1002 to provide timing for the start of an access and the output of a valid address. As for transmission lines which carry other control signals such as a read/write signal, they are not the main features of the invention and so their explanation is omitted here.

Bus ADW[15:0] is a unidirectional bus that carries signals from the master LSI 1001 to the slave LSI 1002. When the master LSI 1001 performs a write access, bus ADW[15:0] is used to transmit a write address (Address[13:0]) and write data (Dataout[15:0]), whereas when the master LSI 1001 performs a read access, bus ADW[15:0] is used to transmit a read address (Address[13:0]).

Bus ADR[15:0] is a unidirectional bus that carries signals from the slave LSI 1002 to the master LSI 1001. When the master LSI 1001 performs the write access, bus ADR[15:0] is idle, whereas when the master LSI 1001 performs the read access, bus ADR[15:0] is used to transmit read data (ADout[15:0]). It is preferable to alternately route the bus lines of bus ADW[15:0] and the bus lines of bus ADR[15:0] on a printed board, so as to suppress crosstalk between adjacent lines.

The master LSI 1001 is provided with bus interfacing circuitry which is made up of an output switching unit 1003, selectors 1004*n*–1004*a*, output buffers (drivers) 1005*r*–1005*a*, and input buffers (receivers) 1006*p*–1006*a* (the output buffers and the input buffers are partly omitted in FIG. 15). In the figure, Address[13:0] denotes a write/read address generated in the master LSI 1001, Dataout[15:0] denotes write data supplied from a register or the like in the master LSI 1001, and Datain[15:0] denotes read data inputted into a register or the like in the master LSI 1001.

As with the above alternately routed bus lines, in the master LSI 1001 it is preferable to alternately place the input buffers with input terminals coupled thereto and the output buffers with output terminals coupled thereto.

The output switching unit 1003 controls the selectors 1004*n*–1004*a*. In write access, the output switching unit 1003 has the selectors 1004*n*–1004*a* select Address[13:0] and then Dataout[15:2]. in read access, the output switching unit 1003 has the selectors 1004*n*–1004*a* select Address[13:0]. The selection of Address[13:0] is done in sync with the strobe signal. Which is to say, the output switching unit 1003 has the selectors 1004*n*–1004*a* select Address[13:0] while the strobe signal is active.

The selectors 1004*n*–1004*a* are given Address[13:0] and Dataout[15:2] and select one of them under control of the output switching unit 1003. Specifically, the selectors 1004*n*–1004*a* act as a multiplexer for time division multiplexing Address[13:0]. and Dataout[15:2] on bus lines ADW[15:2].

The output buffers 1005*r* and 1005*q* respectively output the clock signal CLK and the strobe signal STRB onto the transmission lines 1009*a* and 1009*b*. The output of an address and the input/output of data by the master LSI 1001 are carried out in sync with the clock signal CLK.

The output buffers 1005*p*–1005*c* output Address[13:0] or Dataout[15:2] selected by the selectors 1004*n*–1004*a*, onto bus lines ADW[15:2].

The output buffers 1005*b* and 1005*a* output Dataout[1:0] onto bus lines ADW[1:0], in write access.

The input buffers 1006*p*–1006*a* receive read data from bus ADR[15:0] in read access, and pass the read data to a register in the master LSI 1001 as Datain[15:0].

The slave LSI 1002 is provided with bus interfacing circuitry which is made up of input buffers 1007*r*–1007*a* and output buffers 1008*p*–1008*a* (the output and input buffers are partly omitted in FIG. 15). In the figure, ADin[15:2] denotes a 13-bit read/write address and the higher order 13 bits of write data which have been time division multiplexed on bus lines ADW[15:2], ADin[1:0] denotes the lower order 2 bits of the write data, and ADout[15:0] denotes read data supplied from inside the slave LSI 1002.

As with the master LSI 1001, in the slave LSI 1002 it is preferable to alternately place the input buffers with their input terminals and the output buffer with their output terminals.

The input buffers 1007*r* and 1007*q* respectively receive the clock signal CLK and the strobe signal STRB from the transmission lines 1009*a* and 1009*b*. The input of an address and the input/output of data by the slave LSI 1002 are carried out in sync with the clock signal CLK.

The input buffers 1007*p*–1007*c* receive an address and data from bus lines ADW[15:2] and output them to an internal latch or the like as ADin[15:2]. Here, to separate the address from the data with which it has been time division multiplexed, the address is held in an address latch (not illustrated) in the slave LSI 1002 in sync with the strobe signal STRB. Meanwhile, the data that follows the address is written through an internal circuit (e.g. a data latch, a data register, or a write data buffer) (not illustrated) into memory cells specified by the address.

The input buffers 1007*b* and 1007*a* receive data from bus lines ADW[1:0].

The output buffers 1008*p*–1008*a* output read data ADout [15:0] onto bus ADR[15:0].

The operation of the above constructed bus system is explained below.

Figure 16A:
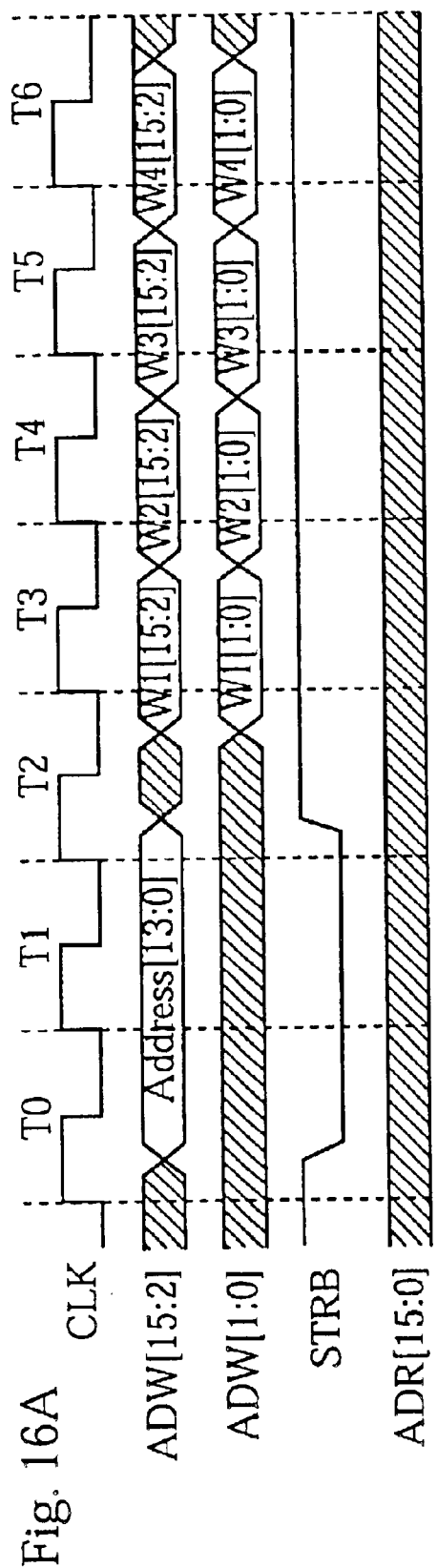
FIG. 16A is a write timing diagram for the bus system shown in FIG. 15.
Figure 16B:
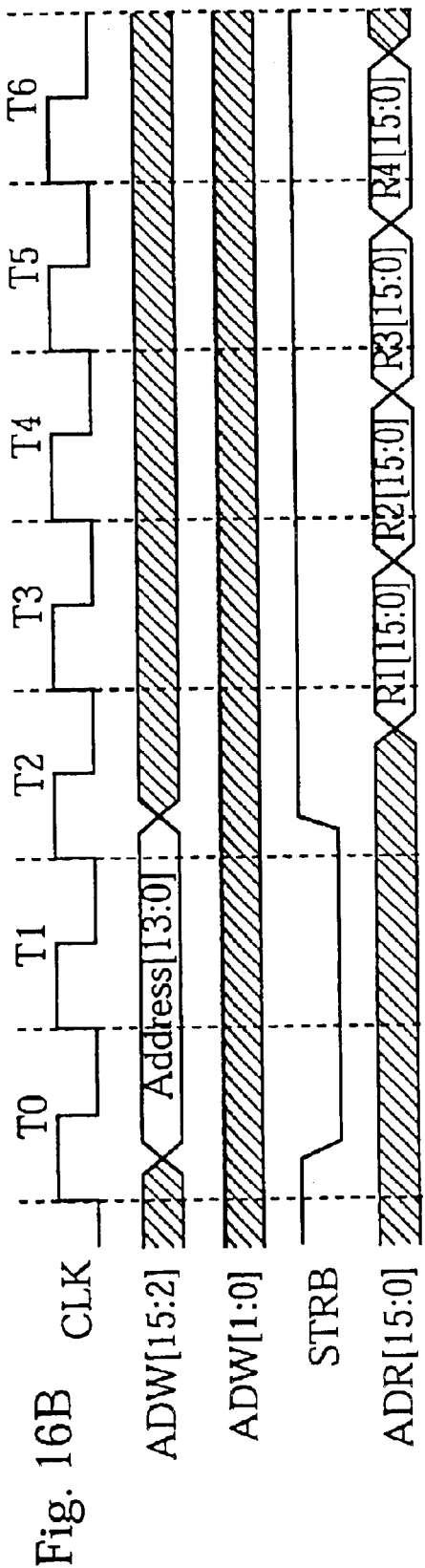
FIG. 16B is a read timing diagram for the bus system shown in FIG. 15.

FIGS. 16A and 16B are respectively a write timing diagram and a read timing diagram for the bus system in FIG. 15. Here, the bus system executes the burst transmission for 4 reads/writes, namely the operation of writing/reading 4 consecutive sets of data in sync with the clock signal CLK after an address is inputted in the slave LSI 1002. The diagonally shaded areas in the figures represent "don't care" states where the output may be any of high level, low level, and high impedance.

First, the write access is explained below with reference to FIG. 16A.

(Cycles T0 and T1)

The master LSI 1001 outputs Address[13:0] and asserts the strobe signal STRB on the rising edge of the clock signal CLK at the start of cycle T0. In this example, the strobe signal STRB is active low.

To be more specific, the output switching unit 1003 is triggered by the rising edge of the clock signal CLK at the start of cycle T0 to have the selectors 1004*n*–1004*a* select Address[13:0]. As a result, Address[13:0] is outputted via the output buffers 1005*p*–1005*c* onto bus lines ADW[15:2]. Concurrently, the strobe signal STRB is asserted to guarantee the validity of Address[13:0]. During this period, bus lines ADW[1:0] and bus ADR[15:0] stay in idle, "don't care" states. The output of Address[13:0] and the assertion of the strobe signal STRB end with the rising edge of the clock signal CLK at the start of cycle T2.

Meanwhile, the master LSI 1001 outputs a read/write signal (not illustrated) to the slave LSI 1002 to inform the latter of the execution of the write access.

(Cycles T2 and T3)

After this, the master LSI 1001 outputs write data Dataout [15:0] (W1[15:0] in FIG. 16A) that has been made valid with the rising edge of the clock signal CLK at the start of cycle T3, onto bus ADW[15:0].

More specifically, the output switching unit 1003 has the selectors 1004*n*–1004*a* select Dataout[15:2] before the rising edge at the start of cycle T3. Consequently, Dataout [15:0] (W1[15:0]) is outputted from the output buffers 1005*p*–1005*a* onto bus ADW[15:0].

(Cycles T4–T6)

In a like manner, the master LSI 1001 outputs W2[15:0], W3[15:0], and W4[15:0] which have been made valid on the rising edges at the start of respective cycles T4, T5, and T6, onto bus ADW[15:0].

In cycles T3–T6, the slave. LSI 1002 captures W1[15:0] W4[15:0] from bus ADW[15:0] via the input buffers 1007*p*–1007*a* and writes them into its internal register or the like in sequence.

Next, the read access is explained below with reference to FIG. 16B.

(Cycles T0 and T1)

The master LSI 1001 outputs Address[13:0] and asserts the strobe signal STRB on the rising edge of the clock signal CLK at the start of cycle T0. Here, the strobe signal STRB is active low. This operation is analogous to cycles T0 and T1 in FIG. 16A.

The master LSI 1001 also outputs a read/write signal (not illustrated) to the slave LSI 1002 to inform the latter of the execution of the read access.

(Cycles T2–T6)

The slave LSI 1002 outputs read data ADout[15:0] (R1 [15:0]) which has been made valid on the rising edge of the clock signal CLK at the start of cycle T3, onto bus ADR [15:0]. In the meantime, bus ADW[15:0] is in an idle, "don't care" state.

In the same manner, the slave LSI 1002 outputs R2[15:0], R3[15:0], and R4[15:0] which have been made valid on the rising edges at the start of respective cycles T4, T5, and T6, onto bus ADR[15:0] in sequence.

In cycles T3–T6, the master LSI 1001 sequentially captures R1[15:0]–R4[15:0] from bus ADR[15:0] via the input buffers 1006*p*–1006*a* and writes them into its internal register, each as Datain[15:0].

As described above, the bus system of the seventh embodiment transmits an address, write data, and read data through only unidirectional buses, thereby facilitating impedance matching and speeding up of the clock.

Note here that though an address and read/write data are respectively set to be 14 bits long and 16 bits long in this embodiment, the lengths of the address and the read/write data are not limited to such.

Also, though an address and write data are time division multiplexed starting from their MSBs (Address[13] and Dataout[15]) in this embodiment, the invention is not limited to such, as long as the address and the write data are multiplexed bit by bit.

Also, though an address is outputted for two clock pulses and the input/output of data which follows the address is commenced after an interval of one clock pulse, the timing and duration of outputting an address or inputting/outputting data are determined between LSIs that conduct data transfer in consideration of system parameters such as set-up time and hold time, so that the invention is not limited to such timing and duration as embodied above.

Also, the strobe signal STRB, which is used in this embodiment to indicate that anything but data (e.g. an address) is being transmitted on a bus, is analogous to signals such as RAS (Row-Address Strobe) and CAS (Column-Address Strobe) used for SDRAMs (Synchronous Dynamic Random Access Memories) and DRAMs and FRAME# used for PCI (Peripheral Component Interconnect) interfaces.

Figure 17:
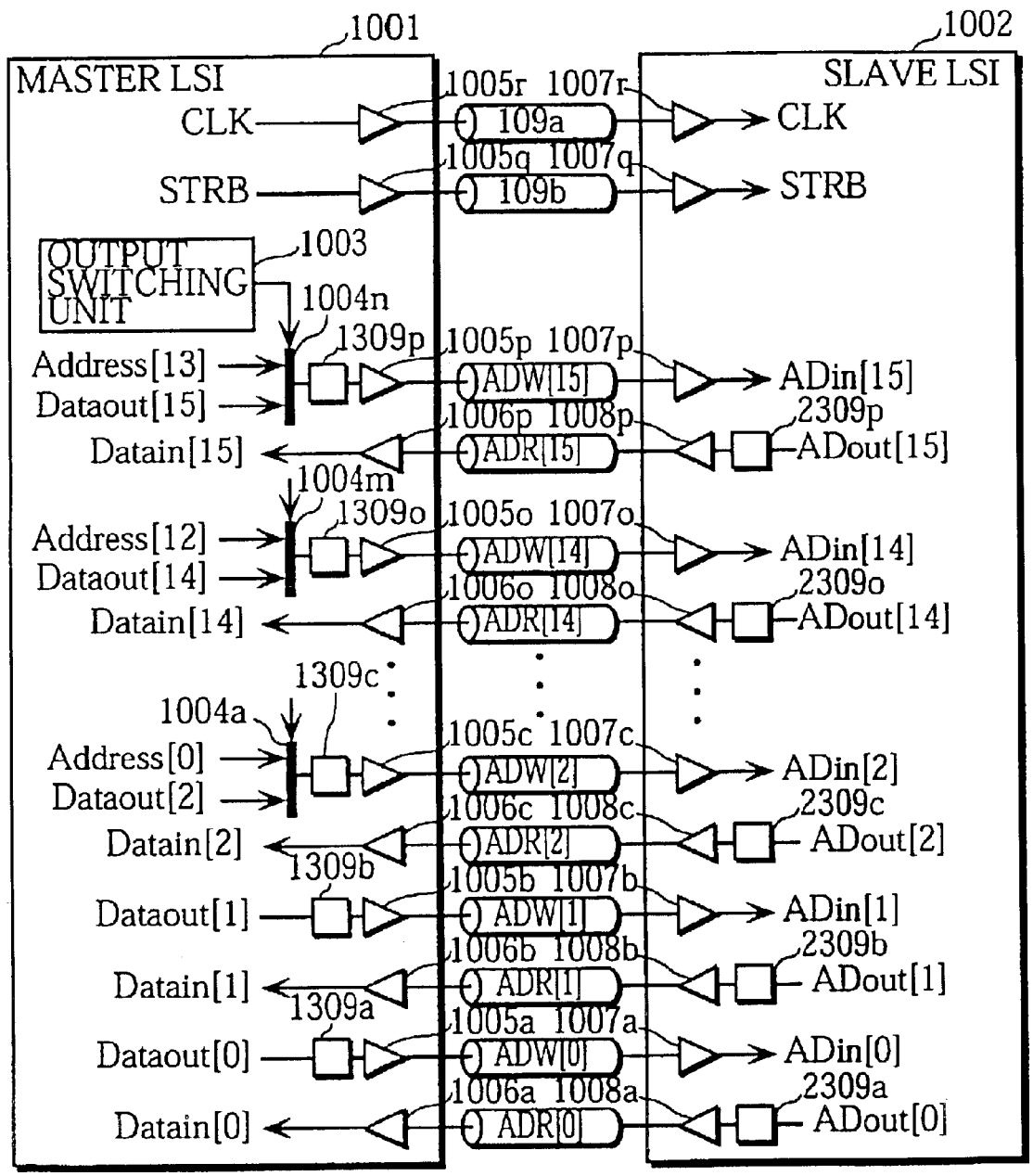
FIG. 17 shows a variant of the bus system shown in FIG. 15.

Further, the bus system in FIG. 15 may be modified in such a way as to further include holding circuits 1309*p*–1309*a* and holding circuits 2309*p*–2309*a*, as shown in FIG. 17.

In FIG. 17, the holding circuits 1309*p*–1309*a* are inserted on the input lines of the output buffers 1005*p*–1005*a* in the master LSI 1001, to hold an address or data which was last outputted onto bus ADW[15:0]. In so doing, while bus ADW[15:0] is carrying neither address nor data (i.e. during idle time of bus ADW[15:0]), the address or data held in the holding circuits 1309*p*–1309*a* is outputted via the output buffers 1005*p*–1005*a* onto bus ADW[15:0], thereby maintaining bus ADW[15:0] high or low.

The holding circuits 2309*p*–2309*a* are inserted on the input lines of the output buffers 1008*p*–1008*a* in the slave LSI 1002, to hold data which was last outputted onto bus ADR[15:0]. In doing so, while bus ADR[15:0] is idle, the data held in the holding circuits 2309*p*–2309*a* is outputted via the output buffers 1008*p*–1008*a* onto bus ADR[15:0], thereby maintaining bus ADR[15:0] high or low.

Each of the above holding circuits may be implemented by a D-type flip-flop, a latch, a transparent latch, or the like.

FIGS. 18A and 18B are respectively a write timing diagram and a read timing diagram for the bus system shown in FIG. 17. When comparing these timing diagrams with FIGS. 16A and 16B, the timing of transmitting a valid address and data is the same but the following differs with FIGS. 16A and 16B. In FIGS. 18A and 18B, there are no "don't care" states of buses ADW[15:0] and ADR[15:0] unlike FIGS. 16A and 16B (in which the diagonally shaded areas represent such "don't care" states). This is because in FIGS. 18A and 18B a bus during its idle time is fixed at the same level as an address or data that was last outputted onto the bus.

Given that the bus lines of bus ADW[15:0] and the bus lines of bus ADR[15:0] are alternately routed, with the above modification each bus line which is active will end up being sandwiched between bus lines whose levels are fixed. This creates guard traces along each active bus line. Hence noise such as crosstalk caused by increases in transfer rate is effectively reduced. Also, since each idle bus line stays at the same level as it did during the last transmission, an unwanted charge or discharge on such a bus line can be suppressed, with it being possible to avoid increases in power consumption.

Eighth Embodiment

Figure 19:
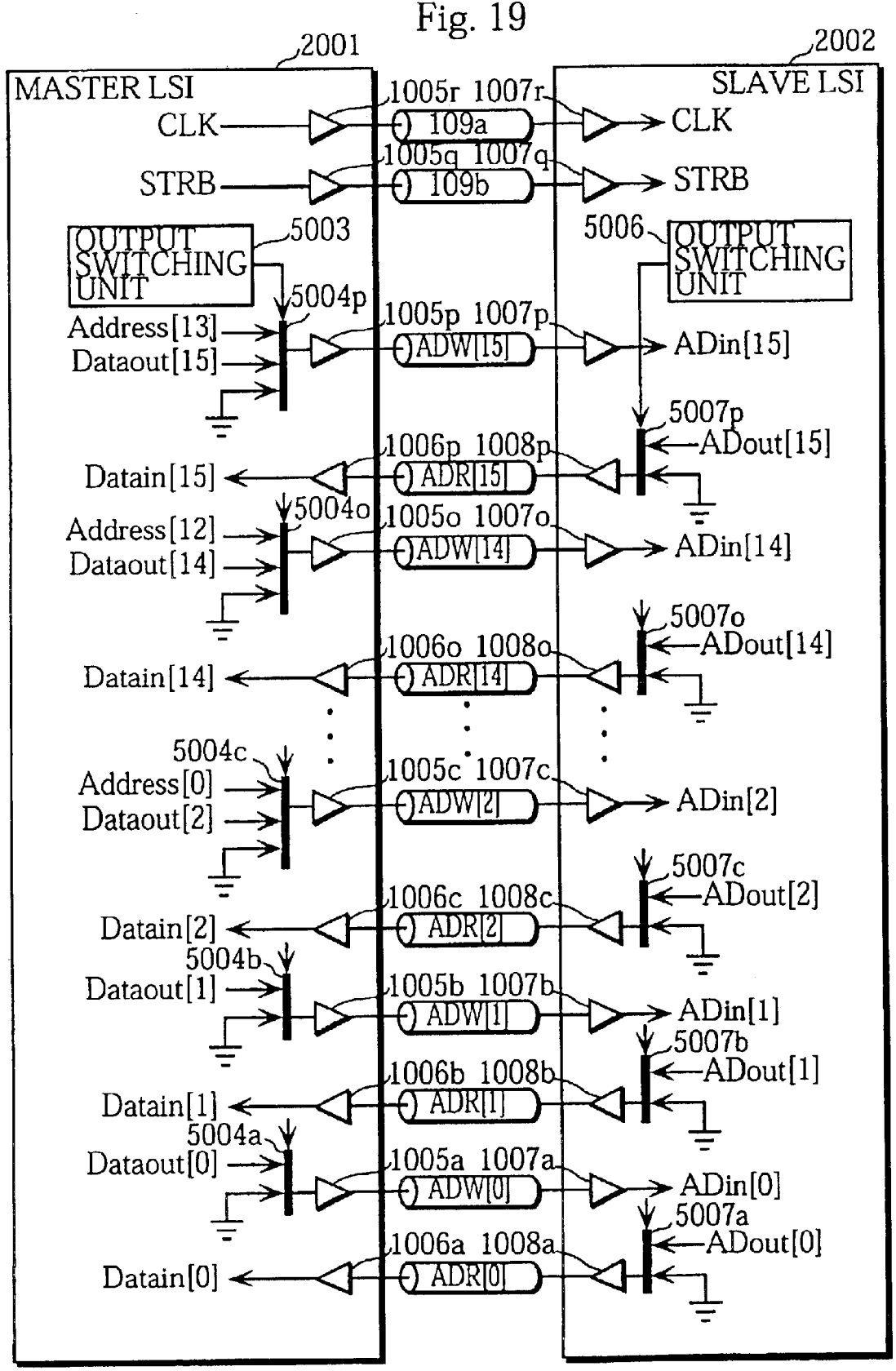
FIG. 19 shows the construction of a bus system according to the eighth embodiment of the invention.

FIG. 19 shows the construction of a bus system according to the eighth embodiment of the invention. In the figure, construction elements which are the same as those in the seventh embodiment shown in FIG. 15 have been given the same reference numerals and their explanation has been omitted, so that the following explanation will focus on the differences with the seventh embodiment.

The bus system in FIG. 19 differs with the bus system in FIG. 15 in that a master. LSI 2001 and a slave LSI 2002 have replaced the master LSI 1001 and the slave LSI 1002. When compared with the master LSI 1001, the master LSI 2001 is equipped with an output switching unit 5003 in place of the output switching unit 1003 and selectors 5004p–5004c in place of the selectors 1004n–1004a, and is newly equipped with selectors 5004b and 5004a.

Like the output switching unit 1003 in FIG. 15, the output switching unit 5003 controls the selectors 5004p–5004c to select Address[13:0] or Dataout[15:2]. However, unlike the output switching unit 1003, the output switching unit 5003 also controls the selectors 5004p–5004a to select a ground level (or a low level) when bus ADW[15:0] is idle.

The selectors 5004p–5004c receive Address[13:0], Dataout[15:2], and the ground level, select one of them under control of the output switching unit 5003, and output it through the output buffers 1005p–1005c onto bus lines ADW[15:2].

The selectors 5004b and 5004a receive Dataout[1:0] and the ground level, select one of them under control of the output switching unit 5003, and output it through the output buffers 1005b and 1005a onto bus lines ADW[1:0].

When compared with the slave LSI 1002 in FIG. 15, the slave LSI 2002 is newly equipped with an output switching unit 5006 and selectors 5007p–5007a.

The output switching unit 5006 controls the selectors 5007p–5007a to select the ground level while bus ADR [15:0] is being idle.

The selectors 5007p–5007a receive ADout[15:0] and the ground level, select one of them under control of the output switching unit 5006, and output it through the output buffers 1008p–1008a onto bus ADR[15:0].

The above constructed bus system operates in the following way.

FIGS. 20A and 20B are respectively a write timing diagram and a read timing diagram for the bus system shown in FIG. 19. When comparing these timing diagrams with FIGS. 16A and 16B, the timing of transmitting a valid address and data is the same but the following differs with FIGS. 16A and 16B. In FIGS. 20A and 20B, there are no "don't care" states of bus ADW[15:0] and bus ADR[15:0] unlike FIGS. 16A and 16B (in which the diagonally shaded areas represent such "don't care" states). This is because in FIGS. 20A and 20B a bus during its idle time is held at ground level (or low level).

Given that the bus lines of bus ADW[15:0] and the bus lines of bus ADR[15:0] are alternately routed, with this embodiment each bus line which is active will end up being sandwiched between bus lines with the ground level. This forms guard traces along each active bus line. As a result, not only impedance matching is ensured but noise such as crosstalk caused by increases in transfer speed is efficiently suppressed.

Though an idle bus is held low in this embodiment, the idle bus may be held high. It is also possible to hold some bus lines of the idle bus low and the others high.

Ninth Embodiment

Figure 21:
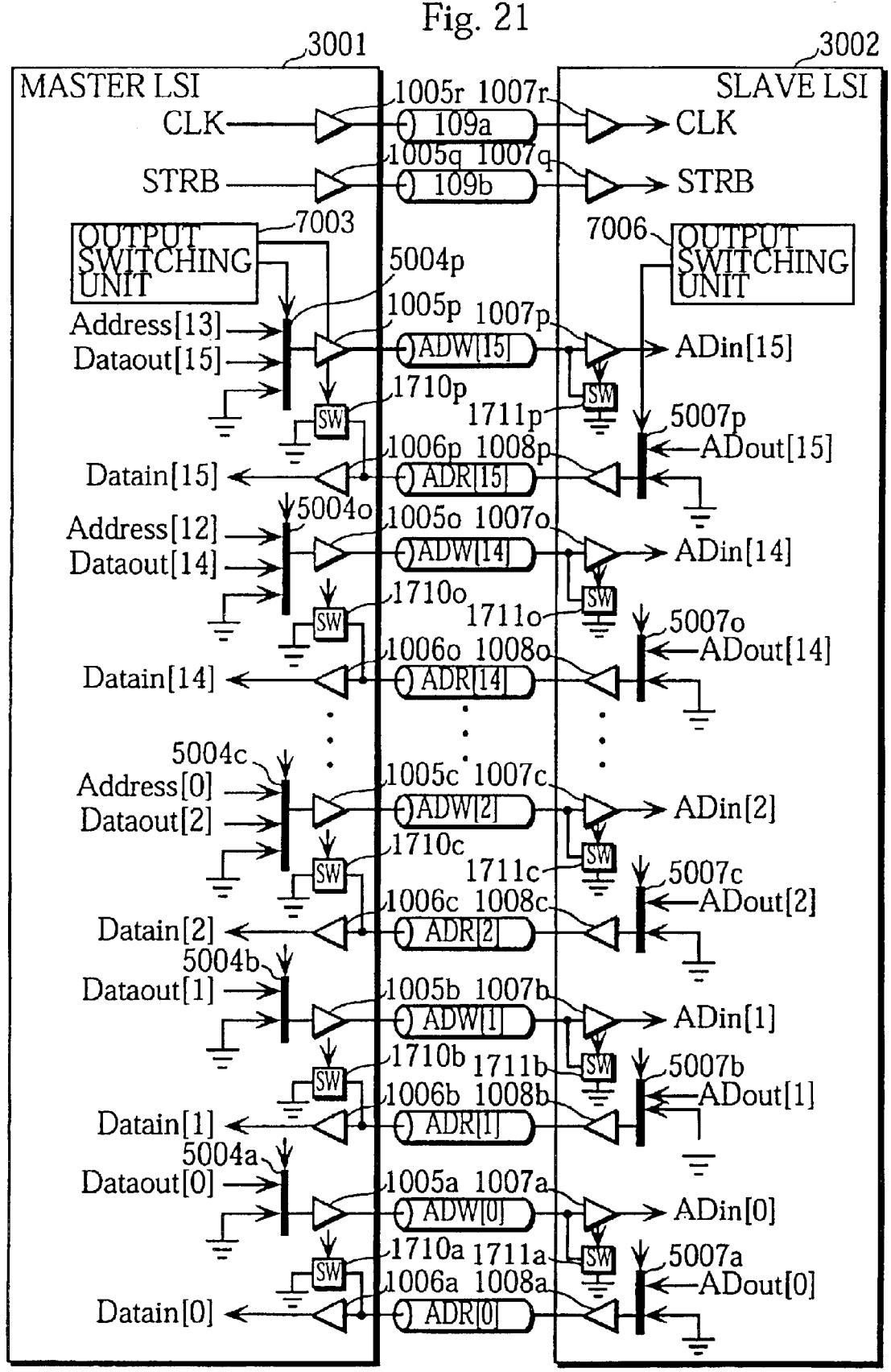
FIG. 21 shows the construction of a bus system according to the ninth embodiment of the invention.

FIG. 21 shows the construction of a bus system according to the ninth embodiment of the invention. In the figure, construction elements which are the same as those in the eighth embodiment shown in FIG. 19 have been given the same reference numerals and their explanation has been omitted, so that the following explanation will focus on the differences with the eighth embodiment.

The bus system in FIG. 21 differs with the bus system in FIG. 19 in that a master LSI 3001 and a slave LSI 3002 have replaced the master LSI 2001 and the slave LSI 2002.

When compared with the master LSI 2001, the master LSI 3001 includes an output switching unit 7003 instead of the output switching unit 5003 and is newly equipped with switches 1710p–1710a.

The switches 1710p–1710a toggle on/off between the input lines of the input buffers 1006p–1006a and ground lines, under control of the output switching unit 7003.

The output switching unit 7003 has the functions of the output switching unit 5003 and further provides a function of controlling the switches 1710p–1710a. More specifically, when having the selectors 5004p–5004a select the ground level, the output switching unit 7003 has the switches 1710p–1710a toggle off. Otherwise, the output switching unit 7003 has the switches 1710p–1710a toggle on.

When compared with the slave LSI 2002, the slave LSI 3002 includes an output switching unit 7006 instead of the output switching unit 5006 and is newly equipped with switches 1711p–1711a.

The switches 1711p–1711a toggle on/off between the input lines of the respective input buffers 1007p–1007a and ground lines, under control of the output switching unit 7006.

The output switching unit 7006 has the functions of the output switching unit 5006 and further provides a function of controlling the switches 1711p–1711a. To be more specific, when having the selectors 5007p–5007a select the ground level, the output switching unit 7006 has the switches 1711p–1711a toggle off. Otherwise, the output switching unit 7006 has the switches 1711p–1711a toggle on.

According to the above construction, while bus ADW [15:0] is carrying an address or data, the switches 1710p–1710a are on and the selectors 5007p–5007a select the ground level, so that bus ADR[15:0] is held at ground level at both ends thereof. This means that during active time of bus ADW[15:0] each bus line of bus ADW[15:0] is sandwiched between bus lines with the ground level.

On the other hand, while bus ADR[15:0] is carrying data, the switches 1711p–1711a are on and the selectors 5004p–5004a select the ground level, so that bus ADW [15:0] is held at ground level at both ends thereof. This means that during active time of bus ADR[15:0] each bus line of bus ADR[15:0] is sandwiched between bus lines with the ground level.

With the above bus system, impedance matching is ensured without difficulty. Further, since both ends of each bus line adjacent to an active bus line are brought to ground level, guard traces are formed on each active bus line, so that noise such as crosstalk caused by increases in transfer rate is efficiently suppressed.

The bus system shown in FIG. 21 may be modified such that the switches 1710p–1710a and the switches 1711p–1711a are connected to power lines (or high level) instead of ground lines and the selectors 5004p–5004a and the selectors 5007p–5007a are connected to power lines (or high level) instead of ground lines. In this case, idle bus lines will be held at power level (or high level) instead of ground level.

Alternatively, the bus system may be modified so as to hold some of the idle bus lines at ground level (or low level) and the others at power level (or high level).

Figure 22:
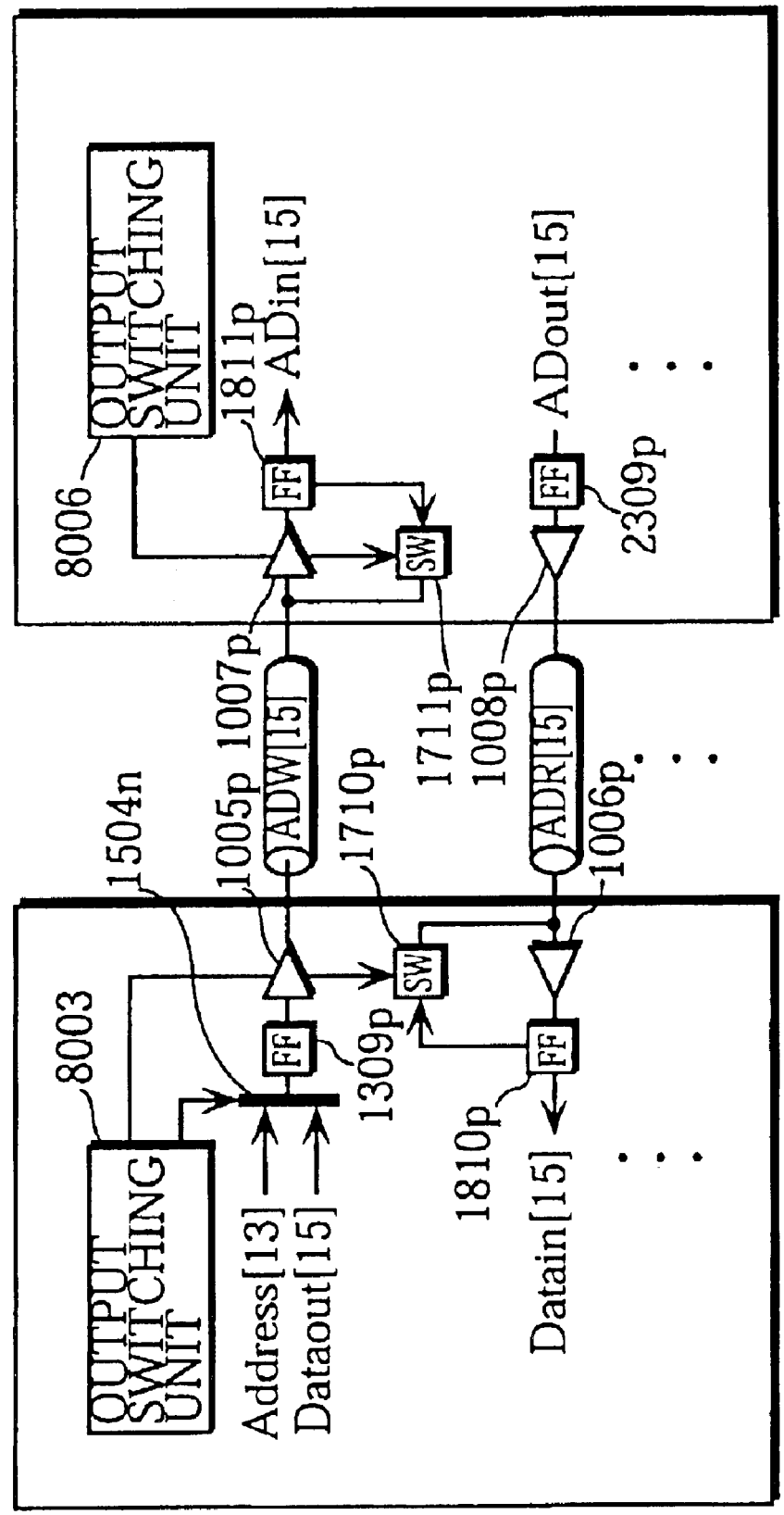
FIG. 22 shows a variant of the bus system shown in FIG. 21.

FIG. 22 shows another variant of the bus system shown in FIG. 21. When compared with FIG. 21, in FIG. 22 an output switching unit 8003 has replaced the output switching unit 7003, holding circuits 1309p–1309a, 1810p–1810a, 2309p–2309a, and 1811p–1811a (shown as "FF" in the figure) have been added, selectors 1504n–1504a have replaced the selectors 5004p–5004c, the selectors 5004b and 5004a have been removed, an output switching unit 8006 has replaced the output switching unit 7006, and the selectors 5007p–5007a have been removed (notice that part other, than the circuitry corresponding to the MSB has been omitted in the figure).

The holding circuits 1309p–1309a and 2309p–2309a are the same as those in FIG. 17, so that their explanation has been omitted.

The holding circuits 1810p–1810a are inserted on the output lines of the respective input buffers 1006p–1006a to hold data which was last inputted in the input buffers 1006p–1006a. The holding circuits 1810p–1810a may be implemented by D-type flip-flops or latches.

During active time of bus ADR[15:0], the switches 1710p–1710a are off under control of the output switching unit 8003. During idle time of bus ADR[15:0], on the other hand, the switches 1710p–1710a are on under control of the output switching unit 8003 and thereby output the level of the data held in the holding circuits 1810p–1810a onto the input lines of the input buffers 1006p–1006a, to maintain the input lines at the level of the last inputted data. Thus, when being idle, one end of bus ADR[15:0] is held at a previous level by the holding circuits 2309p–2309a and the other end of bus ADR[15:0] is held at the same previous level by the switches 1710p–1710a.

The holding circuits 1811p–1811a and the switches 1711p–1711a function in the same way as the holding circuits 1810p–1810a and the switches 1710p–1710a. Accordingly, when being idle, one end of bus ADW[15:0] is held at a previous level by the holding circuits 1309p–1309a and the other end of bus ADW[15:0] is held at the same previous level by the switches 1711p–1711a.

Figure 23:
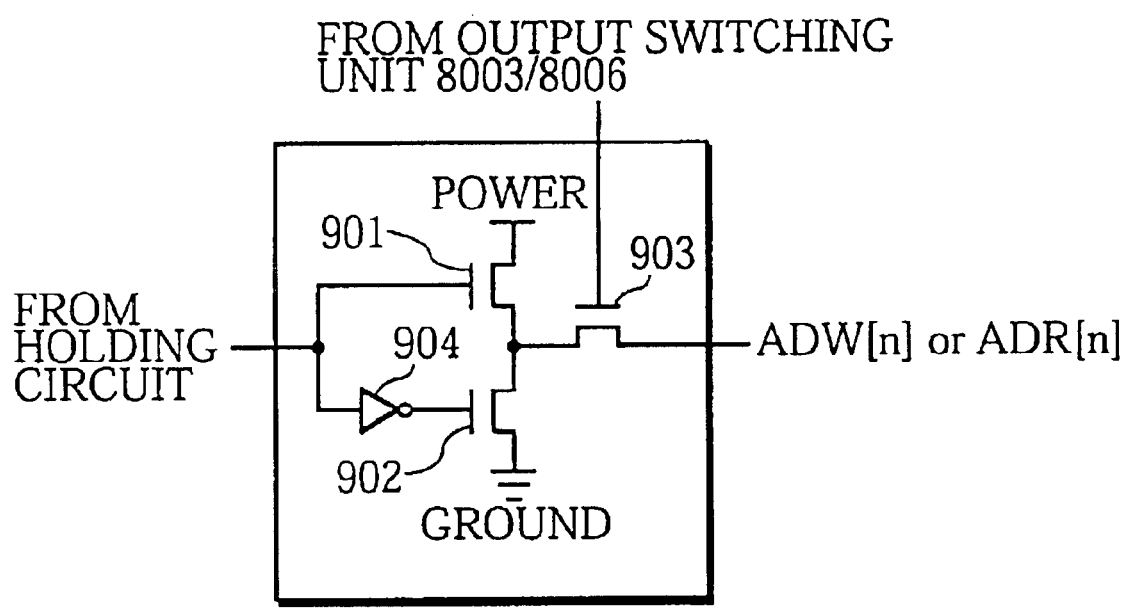
FIG. 23 shows an example circuit of one of the switches shown in FIG. 22.

FIG. 23 shows an example circuit of one of the switches 1710p–1710a and 1711p–1711a. The illustrated switch is mainly made up of FET switches 901–903 and an inverter 904. Here, provided that the switch can change its connection state between the power, the ground, and no connection in response to a level held in a holding circuit and an indication from an output switching unit, a construction other than that in FIG. 23 is also applicable.

With the construction shown in FIG. 22, impedance matching is easily ensured. Further, since both ends of each bus line adjacent to an active bus line are held at the same level (low or high), guard traces are formed along each active bus line, so that noise such as crosstalk which arises when transfer rates increase is effectively reduced. Also, since each idle bus line is maintained at the same level as it did during the last transmission, an unwanted charge or discharge on such a bus line is suppressed, with it being possible to avoid increases in power consumption.

Figure 24:
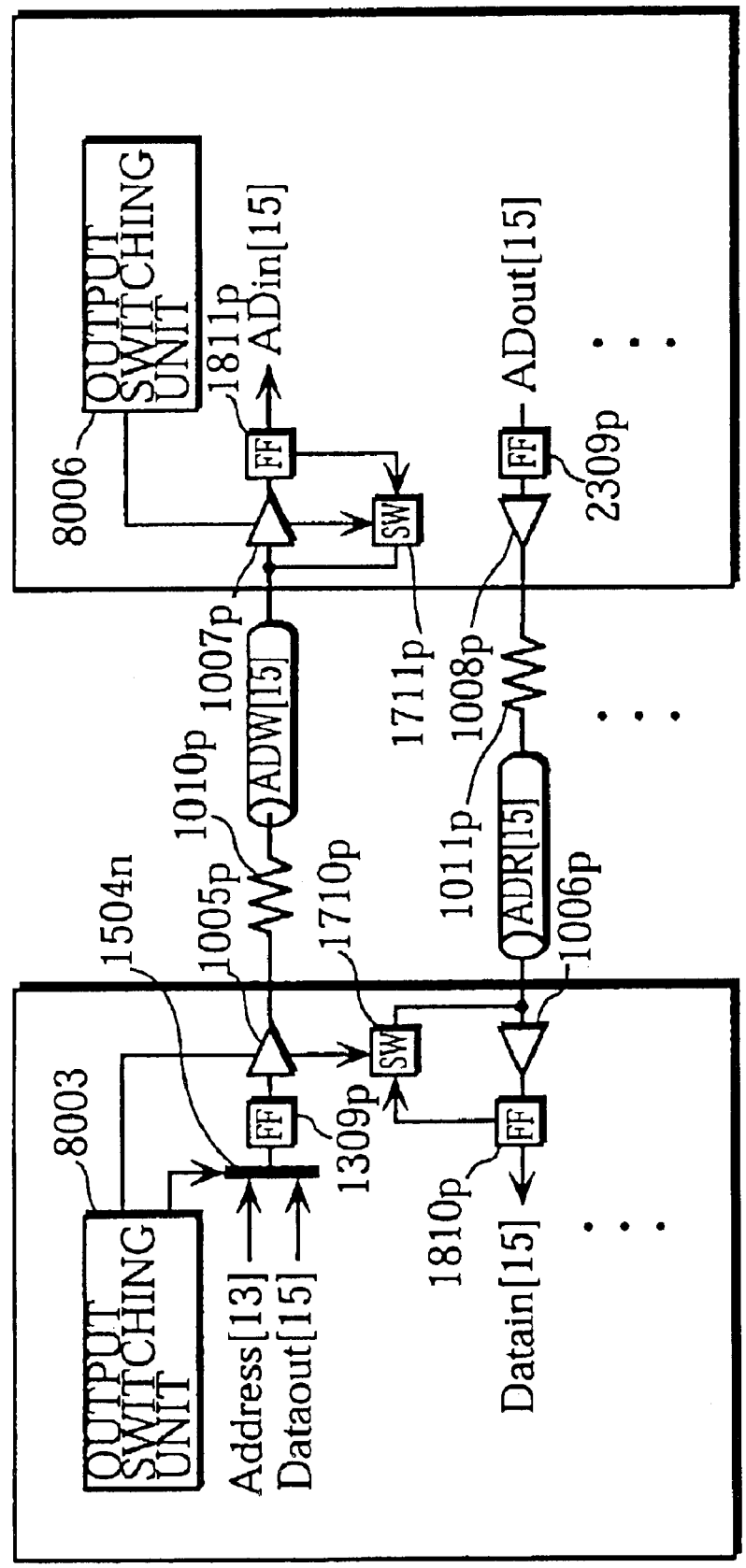
FIG. 24 shows an example circuit where damping resistors are added to the bus system shown in FIG. 22.

In the bus system in FIG. 22, should an output resistance of each output buffer and an impedance of a bus line corresponding to the output buffer mismatch, such mismatches can be resolved by incorporating series terminating resistors (damping resistors) 1010p–1010a and 1011p–1011a as shown in FIG. 24. Here, each damping resistor is preferably inserted as close to an output buffer as possible. A resistance R1 of each of the damping resistors 1010p–1010a is such that R1=Z1−Zo1, where Z1 and Zo1 are respectively a characteristic impedance of a bus line and an output impedance of an output buffer between which the damping resistor is coupled.

Likewise, a resistance R2 of each of the damping resistors 1011p–1011a is such that R2=Z2−Zo2, where Z2 and Zo2 are respectively a characteristic impedance of a bus line and an output impedance of an output buffer between which the damping resistor is coupled.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A bus system for transmitting an address and data between a first LSI (Large Scale Integrated Circuit) that performs an access and a second LSI that is to be accessed, comprising:

a first unidirectional bus including a plurality of signal lines, for transmitting an address and data outputted from the first LSI, to the second LSI; and a second unidirectional bus including a plurality of signal lines, for transmitting data outputted from the second LSI, to the first LSI, wherein the plurality of signal lines included in the first unidirectional bus and the plurality of signal lines in the second unidirectional bus are alternately routed, so that each of the plurality of signal lines in the second unidirectional bus is adjacent to a different one of the plurality of signal lines in the first unidirectional bus, and when the first LSI performs a write access, a write address and write data are transmitted through the first unidirectional bus, and when the first LSI performs a read access, a read address is transmitted through the first unidirectional bus and read data is transmitted through the second unidirectional bus.

2. The bus system of claim 1, wherein in at least one of the first LSI and the second LSI, input and output terminals that correspond to the alternately routed signal lines are alternately placed.

3. The bus system of claim 1, wherein in the write access the write data is transmitted through the first unidirectional bus after the write address.

4. The bus system of claim 1, further comprising maintaining means for maintaining, while at least one of the first unidirectional bus and the second unidirectional bus is idle, a potential of the idle bus at a fixed level which is one of a low level and a high level.

5. The bus system of claim 4, wherein the maintaining means maintains the potential of the idle bus at the fixed level at both ends of the idle bus.

6. A bus system for transmitting an address and data between a first LSI that performs an access and a second LSI that is to be accessed, comprising:

a first unidirectional bus including a plurality of signal lines, for transmitting an address and data outputted from the first LSI, to the second LSI;

a second unidirectional bus including a plurality of signal lines, for transmitting data outputted from the second LSI, to the first LSI;

wherein the plurality of signal lines included in the first unidirectional bus and the plurality of signal lines in the second unidirectional bus are alternately routed, so that each of the plurality of signal lines in the second unidirectional bus is adjacent to a different one of the plurality of signal lines in the first unidirectional bus, and first inputting/outputting means equipped within the first LSI, for outputting a write address and write data onto the first unidirectional bus when the first LSI performs a write access, and outputting a read address onto the first unidirectional bus and inputting read data from the second unidirectional bus when the first LSI performs a read access; and second inputting/outputting means equipped within the second LSI, for inputting the write address and the write data from the first unidirectional bus in the write access, and inputting the read address from the first unidirectional bus and outputting read data onto the second unidirectional bus in the read access.

7. The bus system of claim 6, wherein in at least one of the first LSI and the second LSI, input and output terminals that correspond to the alternately routed signal lines are alternately placed.

8. The bus system of claim 6, wherein the first inputting/outputting means includes:

multiplexing means for time division multiplexing the write address and the write data;

first outputting means for outputting the multiplexed write address and write data onto the first unidirectional bus in the write access, and outputting the read address onto the first unidirectional bus in the read access; and first inputting means for inputting the read data from the second unidirectional bus in the read access, and wherein the second inputting/outputting means includes:

second inputting means for inputting the multiplexed write address and write data from the first unidirectional bus in the write access, and inputting the read address from the first unidirectional bus in the read access; and second outputting means for outputting the read data onto the second unidirectional bus in the read access.

9. The bus system of claim 8, wherein the first outputting means outputs a first fixed level onto the first unidirectional bus while the first unidirectional bus is idle, the first fixed level being one of a low level and a high level.

10. The bus system of claim 9, wherein the first inputting/outputting means further includes first holding means for holding one of write data and a read address which was last outputted by the first outputting means, and, the first outputting means outputs a content of the first holding means onto the first unidirectional bus, while the first unidirectional bus is idle.

11. The bus system of claim 9, wherein the multiplexing means receives the write address, the write data, and the first fixed level, and selects the first fixed level while the first unidirectional bus is idle, and the first outputting means outputs the first fixed level selected by the multiplexing means onto the first unidirectional bus, while the first unidirectional bus is idle.

12. The bus system of claim 9, wherein the second outputting means outputs a second fixed level onto the second unidirectional bus while the second unidirectional bus is idle, the second fixed level being one of the low level and the high level.

13. The bus system of claim 12, wherein the second inputting/outputting means further includes second holding means for holding read data which was last outputted by the second outputting means, and the second outputting means outputs a content of the second holding means onto the second unidirectional bus, while the second unidirectional bus is idle.

14. The bus system of claim 12, wherein the second inputting/outputting means further includes selecting means for receiving the read data and the second fixed level, and selecting the read data in the read access and the second fixed level while the second unidirectional bus is idle, and the second outputting means outputs the second fixed level selected by the selecting means onto the second unidirectional bus, while the second unidirectional bus is idle.

15. The bus system of claim 12, wherein the first inputting/outputting means further includes first maintaining means for maintaining, while the second unidirectional bus is idle, a potential of the second unidirectional bus at the second fixed level at an input port of the first inputting means, and the second inputting/outputting means further includes second maintaining means for maintaining, while the first unidirectional bus is idle, a potential of the first unidirectional bus at the first fixed level at an input port of the second inputting means.

* * * * *